(12) United States Patent
Singh

(10) Patent No.: US 9,992,094 B1
(45) Date of Patent: Jun. 5, 2018

(54) ADAPTIVE FORWARDING TABLES

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 84 days.

(21) Appl. No.: 15/194,370

(22) Filed: Jun. 27, 2016

(51) Int. Cl.
*G01F 11/00* (2006.01)
*H04L 12/26* (2006.01)
*H04L 12/743* (2013.01)

(52) U.S. Cl.
CPC .......... *H04L 43/14* (2013.01); *H04L 45/7453* (2013.01)

(58) Field of Classification Search
None
See application file for complete search history.

(56) References Cited

U.S. PATENT DOCUMENTS

| | | | | |
|---|---|---|---|---|
| 2007/0280104 A1* | 12/2007 | Miyoshi | ................. | H04L 45/00 370/229 |
| 2009/0225752 A1* | 9/2009 | Mitsumori | ............ | H04L 45/245 370/390 |
| 2010/0185680 A1* | 7/2010 | Gilboa | .................... | H04L 63/02 707/802 |
| 2010/0316053 A1* | 12/2010 | Miyoshi | ................. | H04L 45/00 370/392 |
| 2012/0170575 A1* | 7/2012 | Mehra | ..................... | H04L 41/00 370/359 |
| 2012/0233349 A1* | 9/2012 | Aybay | ................. | H04L 47/2441 709/234 |
| 2014/0153571 A1* | 6/2014 | Neugebauer | ........ | H04L 45/7457 370/392 |
| 2014/0269722 A1* | 9/2014 | Uchida | ............... | H04L 45/7453 370/392 |
| 2014/0372567 A1* | 12/2014 | Ganesh | ............... | H04L 67/1002 709/219 |
| 2015/0215213 A1* | 7/2015 | Sundaram | ............... | H04L 47/41 370/231 |
| 2016/0219420 A1* | 7/2016 | Sah | ......................... | H04W 4/14 |
| 2017/0163575 A1* | 6/2017 | Wang | ................. | H04L 49/9094 |

* cited by examiner

*Primary Examiner* — Phirin Sam
(74) *Attorney, Agent, or Firm* — Kilpatrick Townsend & Stockton LLP

(57) ABSTRACT

Disclosed are techniques for implementing a device with memory comprising a data table, the data table configured to store a plurality of elements in buckets, wherein each of the plurality of buckets contains a plurality of elements. The memory can further comprise an indirection table, the indirection table comprising a plurality of bucket reference storage locations and a plurality of hash reference storage locations. The device can include processing logic configured to generate a plurality of hash values using information to be inserted into the data table and locate a hash reference stored in one of the plurality of hash reference storage locations corresponding to one of the plurality of hash values. The processing logic can further locate a bucket of the plurality of buckets corresponding to the one of the plurality of hash values.

20 Claims, 15 Drawing Sheets

US 9,992,094 B1

ADAPTIVE FORWARDING TABLES

BACKGROUND

Data tables can be used in various electronic and computer devices to store data in an organized manner so that specific data elements can later be retrieved. For example, network devices can contain large data tables that can include forwarding tables that can store and/or update identifiers associated with forwarding of network data to other interconnected network devices. These identifiers can indicate destinations (or destinations of next hops along a route through a network) to the other network devices. Several different techniques can be used to efficiently and quickly locate identifiers in a forwarding table. One such technique is through the use of hash functions to produce a hash value that can be used as an index to a specific entry in a forwarding table. However, it can be difficult to create a perfect hashing function that can create a hash value corresponding to all entries in a forwarding table for a given input data set. Therefore, entries in the forwarding table can go unused, resulting in inefficient use of memory for implementation of the forwarding table. Thus, there is need for improvement in the field of data table allocation.

BRIEF DESCRIPTION OF THE DRAWINGS

Various embodiments in accordance with the present disclosure will be described with reference to the drawings, in which.

DETAILED DESCRIPTION

Figure 1:
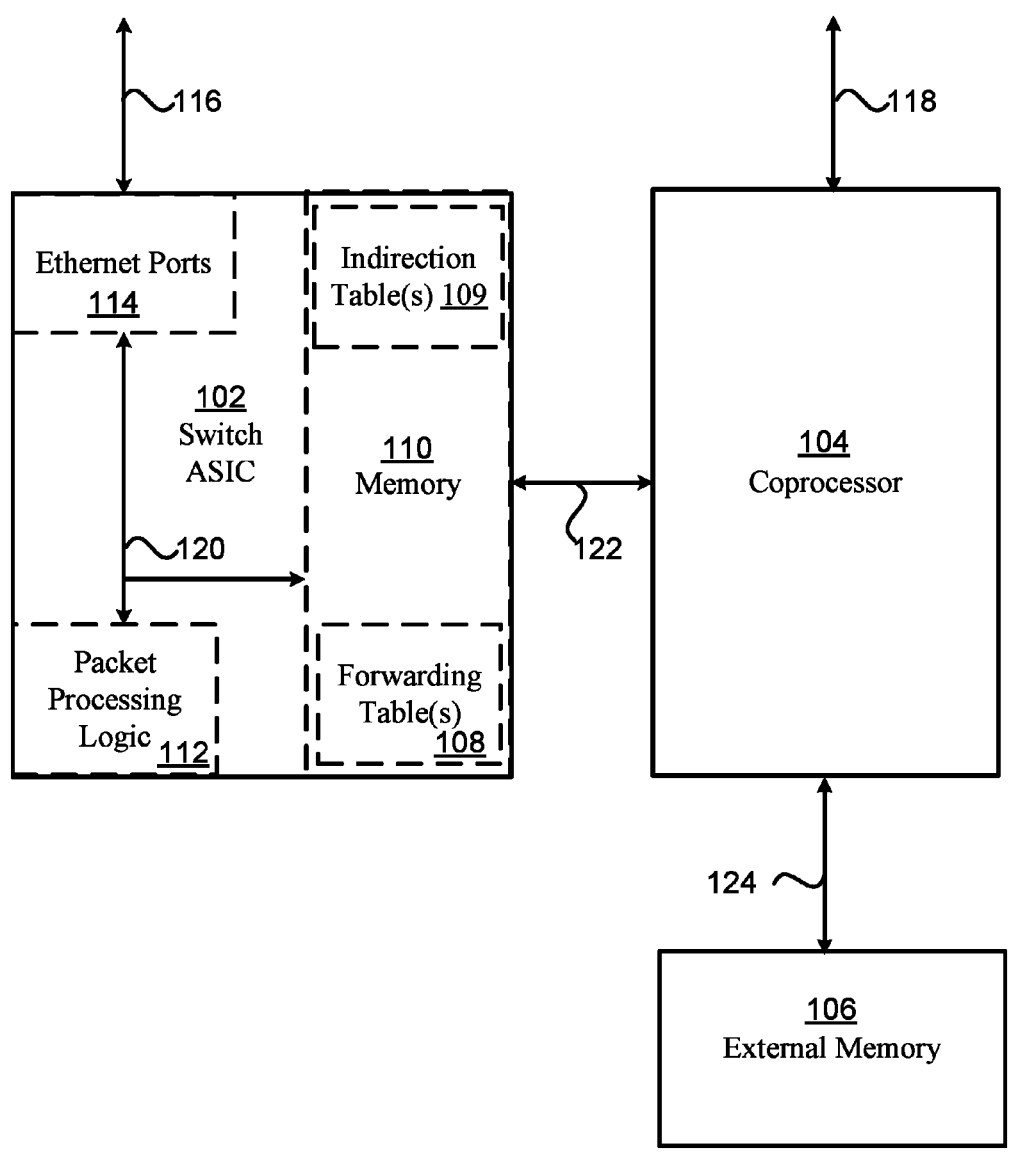
FIG. 1 illustrates an example network device that can include features of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Data tables are types of data structures that can be used in computerized devices for a variety of purposes. Data tables can include tables comprising many different elements. These elements can be arranged in a variety of ways. For example, each element may be associated with a specific memory address or a logical address. Furthermore, each element can contain or be associated with a specific data value. Various techniques, such as hash or key generation technique, can be used to store and/or retrieve data associated with specific elements of a data table. As one example, a hash or key can be generated which references a specific element via an index, memory address, or other indicator.

One example of a data table is a forwarding table that can be used by a network device. A forwarding table can include elements that store data for forwarding of network packets. A network device can receive network packets and route them to an appropriate external network device by locating a destination address for the network packets via an element of a forwarding table. The network device can receive a network packet as an input data set which can be parsed and or otherwise hashed to generate a hash value that indicates an element of a forwarding table. By locating a specific element, the network device can obtain an address and then forward the network packet to an appropriate external network device indicated by the address. For example, a final destination address can be parsed from the network packet. The final destination address can be hashed to obtain a hash value. An element of a forwarding table can be located via the hash value. A next hop address can be retrieved from the forwarding table element. The network packet can then be transferred to the next hop address en route to the final destination address.

Forwarding tables for network devices can be implemented to operate at relatively high speed to support high-speed network transfer protocols such as 100 G (Gigabit/second), 10 G, 1 G, or other, as well as associated high throughput data transfer. Several techniques can be used to enable high speed and high throughput implementation of forwarding tables, such as the previously mentioned hashing techniques. Hashing techniques can enable one or more hash values to be generated for a given data set. Furthermore, the one or more hash values can be used to search elements of a forwarding table in parallel to expedite location of specific forwarding information. Uniform distribution of the elements across the one or more tables allows for faster access of the elements and improves performance. Furthermore, uniform distribution of the elements also improves utilization of the memory for the forwarding tables. However, it can be difficult to obtain a perfect distribution using hashing techniques for all input data sets (e.g., network packets) that a network device may encounter. As one example, a hashing technique can be modeled to evenly distribute forwarding information across a forwarding table for a particular data set (e.g., a unique hash value is generated for each input value for a network device). However, network devices can be implemented in various positions throughout a network infrastructure. Depending on the position that the network device is located within the network infrastructure, the network device may receive various different distributions or set of input network packets that may be difficult to model with a (singular) hash technique for every position/data set.

Furthermore, in order to support speed and throughput requirements of a network device, a forwarding table may be implemented in dedicated memory within the network device that is only used for implementation of the forwarding table. In order to gain advantages related to economies of scale, a singular model of network device may be deployed in various positions within a network infrastructure, each network device including a common hashing technique and forwarding table implementation. As such, the common hashing technique may not be able to perfectly distribute the data set for the network packets across forwarding tables of all devices in all positions of a network infrastructure, resulting in elements of the forwarding tables being unused for many network devices within a network infrastructure. These unused elements can take the form of unused memory locations of the memory locations dedicated for the forwarding tables across the network devices. This unused memory space leads to increased costs for the network devices in the form of unused dedicated memory and/or increased power usage to power the unused memory locations.

In certain embodiments, techniques are disclosed to efficiently integrate hashing techniques with forwarding tables to more evenly distribute forwarding information within forwarding tables while maintaining speed and throughput requirements for network devices. In certain embodiments, an indirection table can be used to redirect a hash value to a different memory location than pointed to by the hash value. The indirection table can be dynamically updated to populate a forwarding table as needed and can be used to more evenly distribute forwarding information across a forwarding table. By evenly, or otherwise distributing the information across the forwarding table through use of an indirection table, unused memory space can be reduced or minimized. By reducing unused memory space, network devices can include less memory, reducing costs and power usage.

In certain embodiments, disclosed techniques can also be used to facilitate validation and verification of a network device by reducing the amount of system resources needed, while maintaining consistency in the architectural view of the network device in the simulation model. The techniques can reduce or minimize the amount of system resources needed for simulating the forwarding tables to test, validate, and diagnose logical and operational functionality of a network device.

FIG. 1 illustrates an implementation of a network device 100, which can be a network switch, for example that can implement features of the disclosure. Network device 100 can include a switch ASIC 102, a coprocessor 104, and/or external memory 106. Although Switch ASIC 102, coprocessor 104, and external memory 106 are illustrated as being separate entities, they can be physically disposed on a singular die and in any combination (e.g., the coprocessor 104 and switch ASIC 102 can be disposed on a singular die). Switch ASIC 102 can be configured to interface 116 with a plurality of differing network devices (not shown). For example, the Switch ASIC 102 can interface with personal computers, network switches, network hubs, mobile devices, or other network devices. Switch ASIC 102 can include one or more Ethernet Ports 114 to enable network communications with other network devices (not shown). The Ethernet Ports 114 can enable network communications using Transmission Control Protocol/Internet Protocol (TCP/IP), Domain Name System (DNS), Hypertext Transfer Protocol (HTTP), Dynamic Host Configuration Protocol (DHCP) or other protocols. The Ethernet Ports 114 can also implement various speeds and methods of transmission such as 100 Gigabit (G), 10 G, 1 G, wired or wireless transmissions. Switch ASIC 102 can also include memory 110. Memory 110 can store forwarding table(s) 108.

Memory 110 can be shared by various blocks of Switch ASIC 102. Memory 110 and/or memory stored can be static Random Access Memory (RAM), dynamic RAM, double date rate RAM, flip-flops, or other types of memory to store data. Memory 110 can includes memory partitioned or otherwise selected for use by forwarding table(s) 108. Forwarding table(s) 108 can include elements for forwarding of various network packets that are received by network device 100 via Ethernet ports 114, for example. Forwarding table(s) 108 can be used in conjunction with indirection table(s) 109, as disclosed herein.

Switch ASIC 102 can also include packet processing logic 112 that can include logic gates, memory, processing cores, or other elements. Packet processing logic 112 can include a processor core such as an x86 or ARM® compatible processor core, for example, and/or can implement one or more fixed function units, Field Programmable Gate Arrays (FPGA), or other functional units. Various interconnects such as interconnect 120 can be used to pass information between the various blocks of switch ASIC 102. The interconnects (such as interconnect 120) can include point to point interconnect(s), common bus(es), or combinations thereof.

Coprocessor 104 can include a processor core such as an x86 or ARM® compatible processor core, for example, and/or can implement one or more fixed function units, Field Programmable Gate Array (FPGA), or the like. Coprocessor 104 can implement various functionalities associated with network device 100. For example, Coprocessor 104 can be used to execute software that may or may not be stored in memory, such as external memory 106 and/or onboard memory (not shown). Coprocessor 104 can communicate with Switch ASIC 102 via interface 122. Interface 122 can include a Peripheral Component Interconnect (PCI), Serial Peripheral Interface (SPI), Universal Serial Bus (USB), a parallel interface, or various other topologies. Interface 124 between Coprocessor 104 and External memory 106 can similarly be configured with similar topologies.

Coprocessor 104, Packet processing Logic 112, Memory 110, External Memory 106, and/or forwarding table(s) 108 can be used to implement a control plane for network device 100. A control plane, as used herein, can be a functional representation of a network device that concerns routing or control of network packets. In other words, a control plane can be used to orchestrate the movement of network packets through a network device or through a network comprising multiple devices. Ethernet Ports 114 (and/or Coprocessor 104, Packet Processing Logic 112, Memory 110, External Memory 106) can be used to implement a data plane for network device 100. A data plane, as used herein, can be a functional representation of a network device concerning carrying/movement of network packets. In other words, the control plane directs the traffic through a network or network device while the data plane performs the actually movement of the data. If a data plane is correlated to a bus, the control plane can be correlated to a bus driver.

Forwarding table(s) 108 can be used to indicate network device addresses, distances between network device 100 and particular network destinations, or other information for use in forwarding of network packets. As the network topology changes, forwarding table(s) 108 can be updated accordingly to reflect the changes and optimize the addresses to improve the efficiency of transfer of network packets through the network infrastructure. Forwarding table(s) 108 can be used by the network device 100 to optimize prioritization of the transfer of network packets along with, for example, Quality of Service (QOS) or other optimizations. An Access Control List (ACL) can be a list of permissions that can further enable certain port numbers and/or IP addresses to be available. The ACL and/or forwarding table(s) 108 can each be associated with a counter table to temporarily or otherwise store statistical information concerning the access of certain nodes and/or devices that network device 100 interfaces to, for example. Although, only the ACL and forwarding table(s) 108 are used here as an example, it should be understood that various other functions (even outside of a network device) can be associated with and/or use the functionality of a data table or similar memory construct. As one such example, a device cache can use a data table to increment cache hits and/or misses. As such, this disclosure is not limited to a data table for use with only a network device such as network device 100, but can be used in a wide variety of devices for a wide variety of purposes. Many data tables and other memory constructs can benefit from the disclosure herein. As described herein, data tables stored within switch ASIC 102 can be relatively large to enable commonality of switch ASIC 102 for use with variously implemented network devices (such as network device 100), and therefore require a relatively large amount of memory. Depending upon a number of network devices and the implementation of the network devices within a network infrastructure, the number of entries of forwarding table 108 can very. If all of the entries of forwarding table 108 are not utilized, then all of memory allocated for forwarding table 108 within switch ASIC 102 may not be used, but may still be powered. Thus, memory that is not utilized may consume power and may needlessly lead to increased power draw by a network device. Furthermore, the additional memory may add cost to the network device, such as in the form of relatively large memory chip(s) on the bill of materials for a network device.

Figure 2:
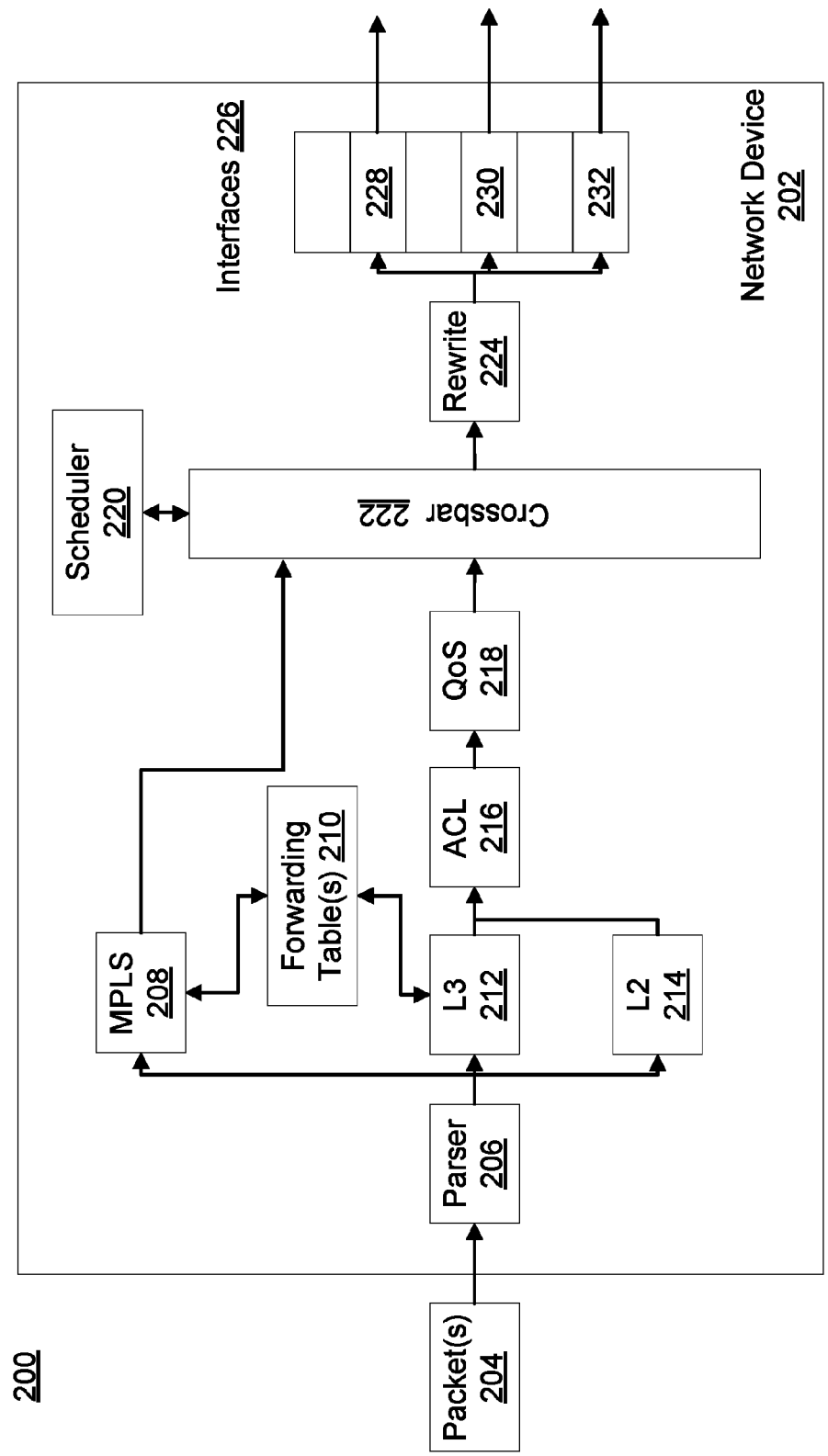
FIG. 2 illustrates an example packet processing logic that can include features of the disclosure.

FIG. 2 illustrates a logical block diagram 200 illustrating techniques for processing and forwarding of network packets. The techniques of diagram 200 can be implemented by network device 100, for example. The device of diagram 200 can be considered a packet processor. The packet processor can also be implemented using pipelined operations to support packet processing speeds for high-speed network data transfer operations, including forwarding information lookups and other packet processing operations. The packet processor can be implemented to provide forwarding of network packets as part of the data plane so that forwarding may be performed without software-based techniques.

Network packet(s) 204 can be received via a network interface, such as via a physical layer (PHY) interface or an ethernet Media Access Control (MAC) layer interface. PHY layer interfaces or MAC layer interfaces can be associated with ethernet ports 114. Network packet(s) 204 can be analyzed to detect valid streams and segment the stream into datagrams (e.g., packets/frames). For instance, the PHY layer may receive and transmit data across physical connections (e.g., such as electrical signals received over twisted-pair coaxial cable or optical signals received over optical fiber) via ethernet ports 114. The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 206 can receive network packets and separate the packet header from the packet payload. Packet parser 206 can parse the packet header to determine and/or extract data for making forwarding decisions for the packet. For example, packet parser 204 can extract different layer headers (e.g., L2, L3, and L4 headers) included in an Internet protocol (IP) version 4 packet, such as the source MAC address, the destination MAC address, the source IP address, the destination IP address, and port numbers. Using information from the layer headers, the network packets can be forwarded to Multiprotocol Label Switching (MPLS) module 208, Level 3 (L3) routing module 212, or Level 2 (L2) routing module 214. MPLS module 208 can use MPLS techniques to make forwarding decisions based on information in the header, bypassing Open System Interconnection (OSI) L2 and L3 routing decisions. MPLS module 208 can also benefits from use of Forwarding Table(s) 210.

A network packet can be forwarded to L3 routing module 212 or L2 routing module 214 in order to determine forwarding and tunneling decisions based on information in the packet header (e.g., packet metadata) extracted by packet parser 206. For example, L3 routing module 212 can locate appropriate forwarding information through the use of Forwarding Table(s) 210. Forwarding Table(s) 210 can, in certain embodiments, be logically partitioned within L3 routing module 212. In certain embodiments, information can be organized and located in elements of Forwarding Table(s) 210. L2 routing module 214 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 204 (e.g., a VLAN and source MAC address), to determine whether an entry for the packet is present in Forwarding Table(s) 210. If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by the network device 100 (otherwise other operations may be performed, such as trapping the network packet for the CPU, bridging the packet out of a listing interface, or flooded out of all ports and an STP forwarding state).

L3 routing module 212 can perform lookups for data in layer 3 (L3) portions of the packet to perform L3 forwarding. For example, IP headers for the packet may be evaluated with respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 220 for scheduling determinations.

Forwarding Table(s) 210 may be implemented in one or multiple storage devices, such as various memory devices (e.g., a CAM, such as TCAM, and/or random access memory) to store table data for performing different routing decisions. Forwarding Table(s) 210 may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List (ACL) module 216 can, based on rules, compare information obtained from a network packet header or elsewhere to make a determination if the network packet header is allowed to be directed to specific destination(s). For example, Access Control List module 216 can include a list of source address(es) of network packets that are allowed to be forwarded to certain address(es). Access Control List module 216 can also include a list of source address(es) of network packets that are not allowed to be forwarded to certain address(es). Additional information can be included within Access Control List module 216 such as protocol version(s), identifying information, or other. After Access Control List module 216 determined whether a specific network packet is approved for forwarding, the network packet can be forwarded to Quality of Service module 218.

Quality of Service (QoS) module 218 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 218 can withhold certain network packets from proceeding to Crossbar 222. Crossbar 222 can be a switch controlling multiple inputs and multiple outputs. The multiple inputs can each be associated with MPLS module 208, QoS module 218, or other. The multiple outputs can each be associated with an outgoing interface port of Interface 226. Illustrated are three example routings of data to interface port 228, interface port 230, and interface port 232 respectively before proceeding to a network device external to network device 202.

Scheduler 220 can control the buffering of packets and scheduling of operations within the network device 202 For example, scheduler 220 can implement a memory management unit to allocate available memory segments for buffering stored packets. Scheduler 220 can also implement a memory management unit to allocate packets from a buffer for final processing and egress. Scheduler 220 can provide the appropriate metadata for a packet. Once a packet has been scheduled, Scheduler 220 can utilize Crossbar 222 and, PHY interface, and/or a MAC layer interface to transmit network packets as network data. Rewrite module 224 can be used to rewrite encapsulation or other information after a packet has traversed crossbar 222, for example. The rewrite module can rewrite encapsulation information to, for example, enable tunneling in the packet, enforce ACL, or appending a next-hop address.

Figure 3:
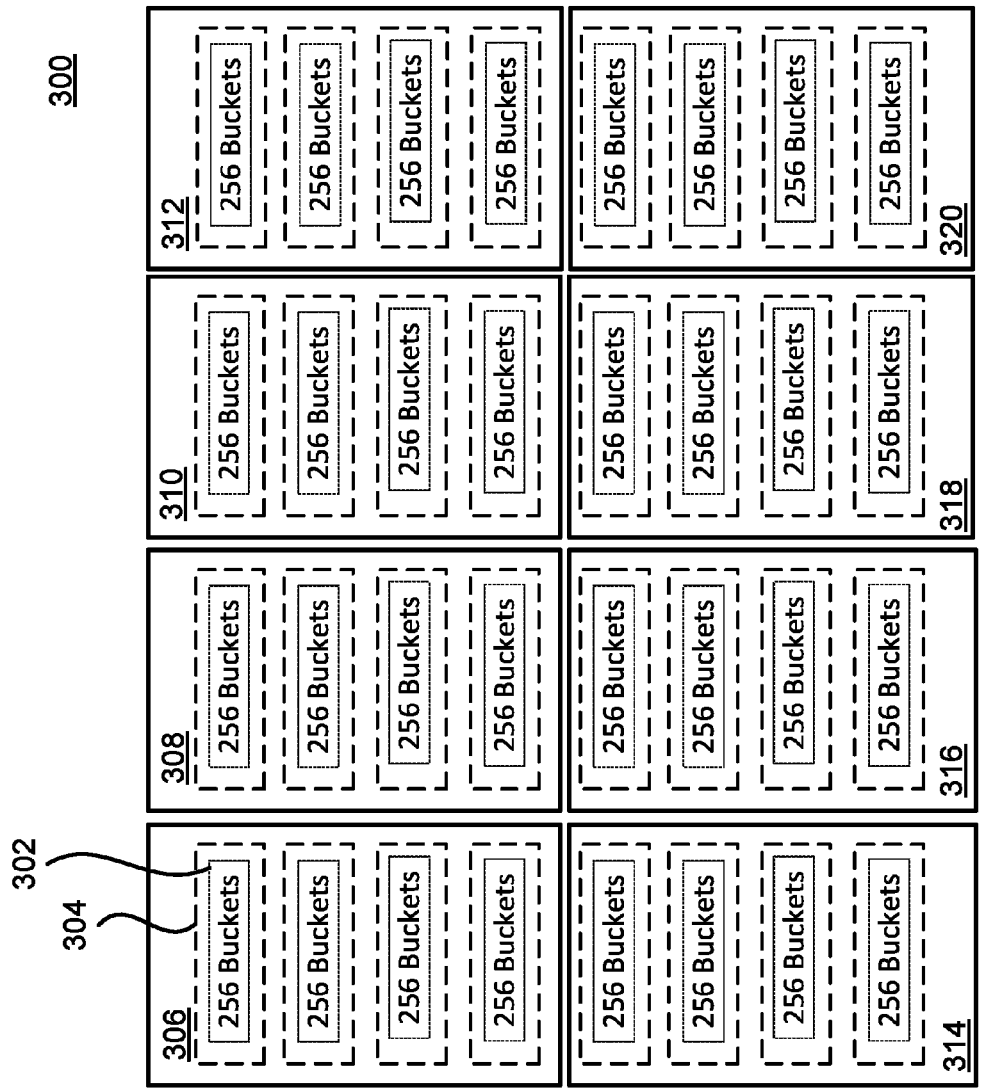
FIG. 3 illustrates an example logical organization of memory for use with a forwarding table of a network device.

FIG. 3 illustrates an example logical block diagram of memory organizations of a routing hash table maintaining forwarding routes that can utilize features of the disclosure. For example, a hash table may be organized into multiple segments of buckets such as segment of buckets 302. Segments can be organized at various sized and in various manners. Each segment can contain a plurality of buckets. Depending on an IP version, or other attributes, specific organizations of segments can be implemented. The segments can be used to implement various search and/or population techniques for a forwarding table, for example. Each of the segment of buckets, such as 302, can contain a number of entries in each bucket. Segment of buckets 302 can be mapped to different segments of a hash table. Bucket mappings may differ for processing IPv4 or IPv6 network packets (though the underlying bucket entry data may stay the same). For example, IPv4 segments 306, 308, 310, 312, 314, 316, 318, and 320 can each include a different number of buckets, such as 1024 buckets per segment and eight segments, as illustrated in FIG. 3 (i.e., 256 buckets*4=1024 buckets). IPv6 segment 304 can include 256 buckets per segment, and 32 segments. Each segment may have an associated identifier. To determine which segment corresponds to which possible key or hash, the same distribution function or mechanism may be utilized as when storing a forwarding route in order to calculate the segment identifier. Note that the segment identifiers for IPv4 segments and IPv6 segments may differ. Segments of buckets can be organized into forwarding tables, for example.

Figure 4:
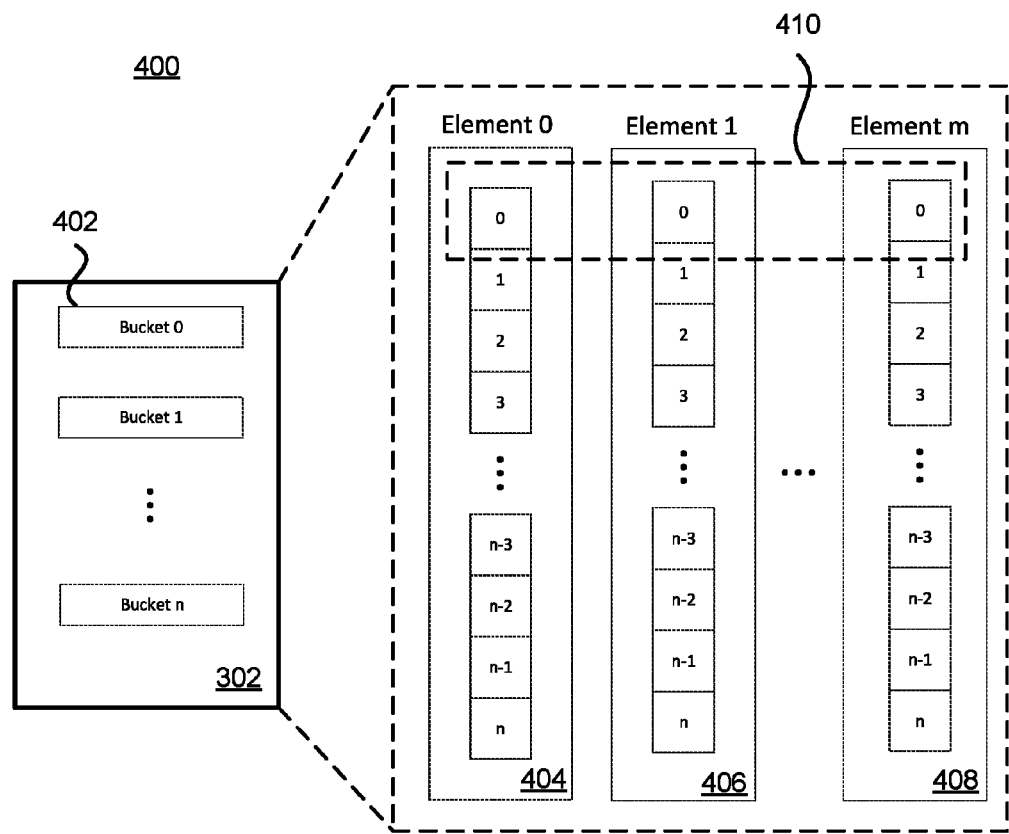
FIG. 4 illustrates an example further logical delineation of the example logical organization of memory for use with a forwarding table of a network device illustrated in FIG. 3.

FIG. 4 illustrates an example further delineation of bucket 302. Bucket 302 can be a bucket of a segment of buckets 302 of FIG. 3, for example. As illustrated, each bucket of a segment of buckets illustrated in FIG. 3 can contain multiple entries. Pluralities of entries are enumerated 404, 406, and 408 in FIG. 4. Bucket 0, for example, can include all of entries 410, for example. Each entry can contain various information to identify forwarding routes such as addresses, pointers, valid fields for trie bitmaps, or other data structures that may be implemented to store aggregated or other routes and/or to determine a next hop address for a forwarding route, as disclosed herein.

Various methods and schemas can be used to associate a data set with a bucket 402 and/or an entry. As one example, a hash function can be used to associate a data set with a particular bucket by, for example, obtaining a hash value that can be associated with an identifier of one or more buckets. The same hash function (or a different function) can be used to obtain a key that uniquely identifies an entry of a bucket. Two separate hash functions can be used to identify a bucket and an entry. Alternatively, digital trees or other mapping functions can be used to associate a data set with a particular bucket and or entry. As an additional feature of the example memory structure, migration can be used to move data between entries or buckets. For example, a hash value can be associated with a plurality of buckets that can, for example, each be associated with a different segment of buckets. When a particular bucket is at capacity, a value can be migrated to another bucket associated with the hash value. In this manner, the multiple buckets and/or entries can be located given a singular hash value, key, and/or combination.

Migration can be used to balance the usage of such buckets or entries so that elements are moved or populated across associated segments of buckets. For example, populating or locating a certain value within a forwarding table can include generating a key and a hash value. The key and/or hash value can be used to locate a specific segments for searching and/or populating. When populating a segment of a forwarding table, it may be found that a specific bucket referenced by a hash value is full and therefore cannot be populated. If a hash technique is used, it may be that an entry corresponding to a specific hash value must be populated so that the hash technique can later be used to retrieve the value. Migration can allow the value to be stored in a different segment. Each segment may contain a bucket corresponding to the hash value. Therefore, migration can allow a value to be stored within a specific bucket referenced by a hash value in any segment of buckets.

As one example of migration when populating one or more buckets, a hash function can be used to generate a hash value that can identify an identifier associated with a particular bucket (or group of buckets). When populating the entries of the bucket(s), a sequential or other schema can be used such that a next available entry is used to store a data value. When locating an already stored data value, a separate function can be used to uniquely associate the data set with an entry of the bucket(s). As one example, a key generation function can be used to associate the data value with a key generated from the data set.

Figure 11:
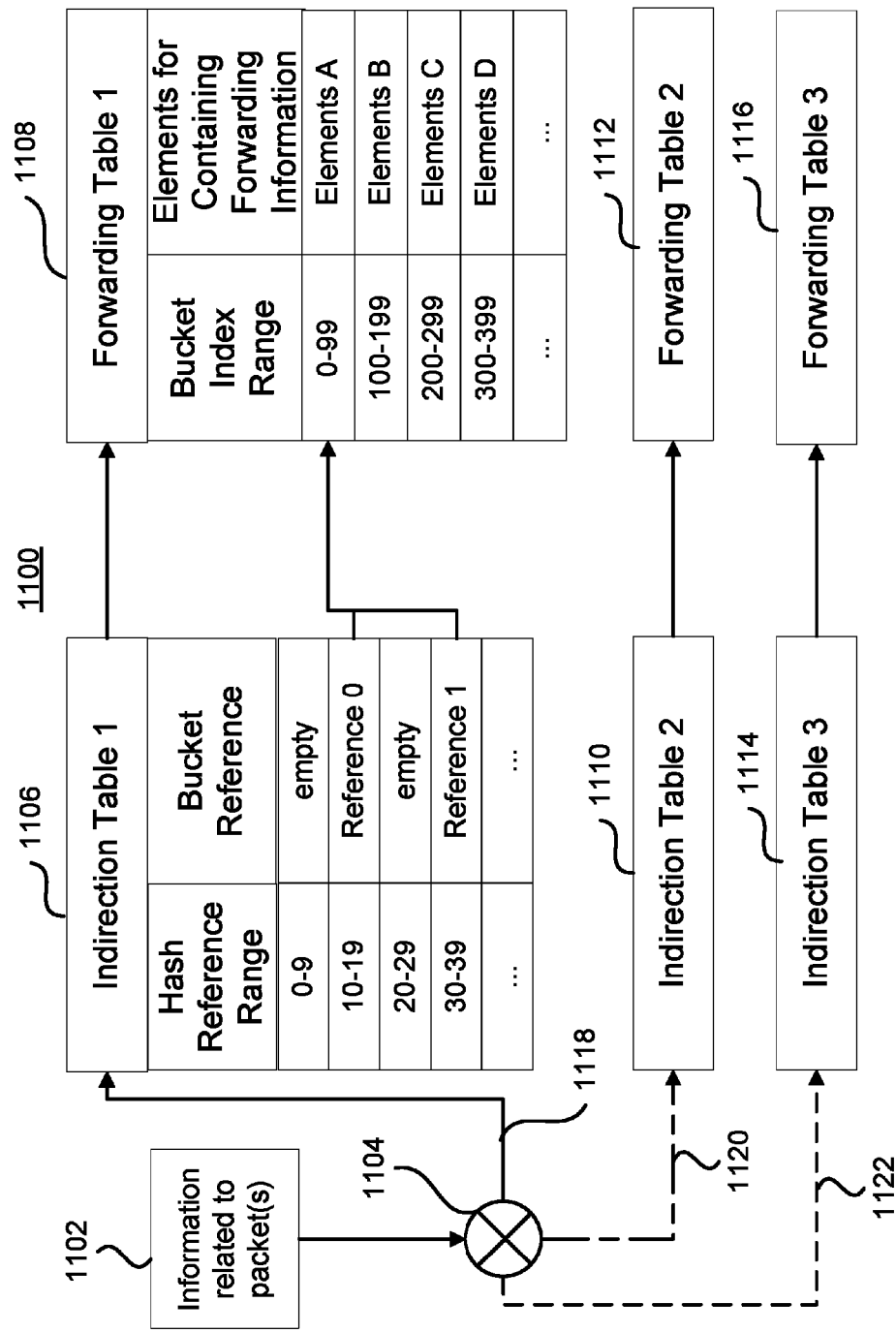
FIG. 11 illustrates migration techniques of a network device according to certain embodiments.

FIG. 11 illustrates a system 1100 configured to implement migration techniques according to certain embodiments. System 1100 includes a plurality of indirection tables 1106, 1110, and 1114. System also includes a plurality of forwarding tables 1108, 1112, and 1116. Each indirection tables of the plurality of indirection tables corresponds to one forwarding table of the plurality of forwarding tables. For example, Indirection table 1106 corresponds to forwarding table 1108. Indirection table 1110 corresponds to forwarding table 1112. System 1110 can be configured such that an indirection table can only reference a forwarding table to which it is associated. For example, indirection table 1106 may only reference corresponding forwarding table 1108 via its bucket references.

System 1100 can also receive information related to network packet(s) 1102. This information can be information gathered from a header of a network packet, for example, and can include route information, egress interface information, etc. Operator 1104 can include functionality of operators 904 or 908 and can additional generate a table index (otherwise known as a table indicator). The table index can be used to select one of indirection tables 1106, 1110, or 1114. For example, when information is to be inserted into an element of any one of forwarding tables 1108, 1112, or 1116, a hash value and a key value can also be generated by operator 1104. System 1110 can locate a hash reference range of an indirection table pointed selected via the use of a table indicator that a generators hash values falls within. For example, a hash value can be 11 and fall within hash reference range 10-19. If so, Bucket Reference 0 can be followed to Bucket Index Range 0-99 and information can be attempted to be inserted into one of Elements A.

If Elements A are full or at a capacity wherein it is deemed that no further elements should be populated, a separate table index can be generated or followed to Indirection Table 1110, for example. The same hash value of 11 can then be used to locate a Hash Reference Range of Indirection Table 1110 and a bucket reference of Indirection Table 1110 followed to Forwarding Table 1112. These techniques are one form of migration as values are attempted to be migrated across various forwarding tables using similar locating information (hash and/or key values). The table indexes can be followed sequentially in order to locate a forwarding table with an available element for a given hash value (that can indicate a particular bucket in each of the forwarding tables). If no available element is found in any of the tables, an error can be encountered. The information may then be dropped, an already populated element overridden, or the hashing techniques altered, for example. Each of paths 1118, 1120, and 1122 indicate separate states of an insertion process for inserting forwarding information into one of forwarding tables 1108, 1112, and 1116. For example, path 1118 indicates a state wherein a table index is followed to indirection table 1108. Path 1120 indicates a state wherein a table index is followed to indirection table 1110 (which can also indicate that forwarding table 1108 does not have an available element to store forwarding information in an appropriate location).

Various other rules and or functions can be used to distribute or allocate data across memory space containing a forwarding table. For example, a rule can prefer to populate entry zero of each bucket rather than populating entry 1 of a bucket. Such a rule would result in a more even distribution of data across entry 0s in the data structure and disfavor the population of any of entry 1 of a bucket. Various methods can be used to effectuate such a distribution. For example, a technique can be used to locate a bucket that does not have entry 0 populated. Alternatively, a secondary function can be used to move data that normally would be stored within an entry 1 to an open entry 0. These methods can communally be referred to as migration functions and can be used to modify the distribution of data within the data structure. It should be understood that these migration functions can take many forms and can be used to distribute data in many different ways. For example, instead of populating entry 1 elements, a particular bucket or group of buckets can instead be populated over another bucket or group of buckets. Likewise, a particular group of entries could be populated over another group of entries. Although buckets and entries are used in the illustrated example of FIG. 4, many different organizations and data structures can be used to effectuate forwarding tables and other data tables without deviating from the disclosure within.

Figure 5:
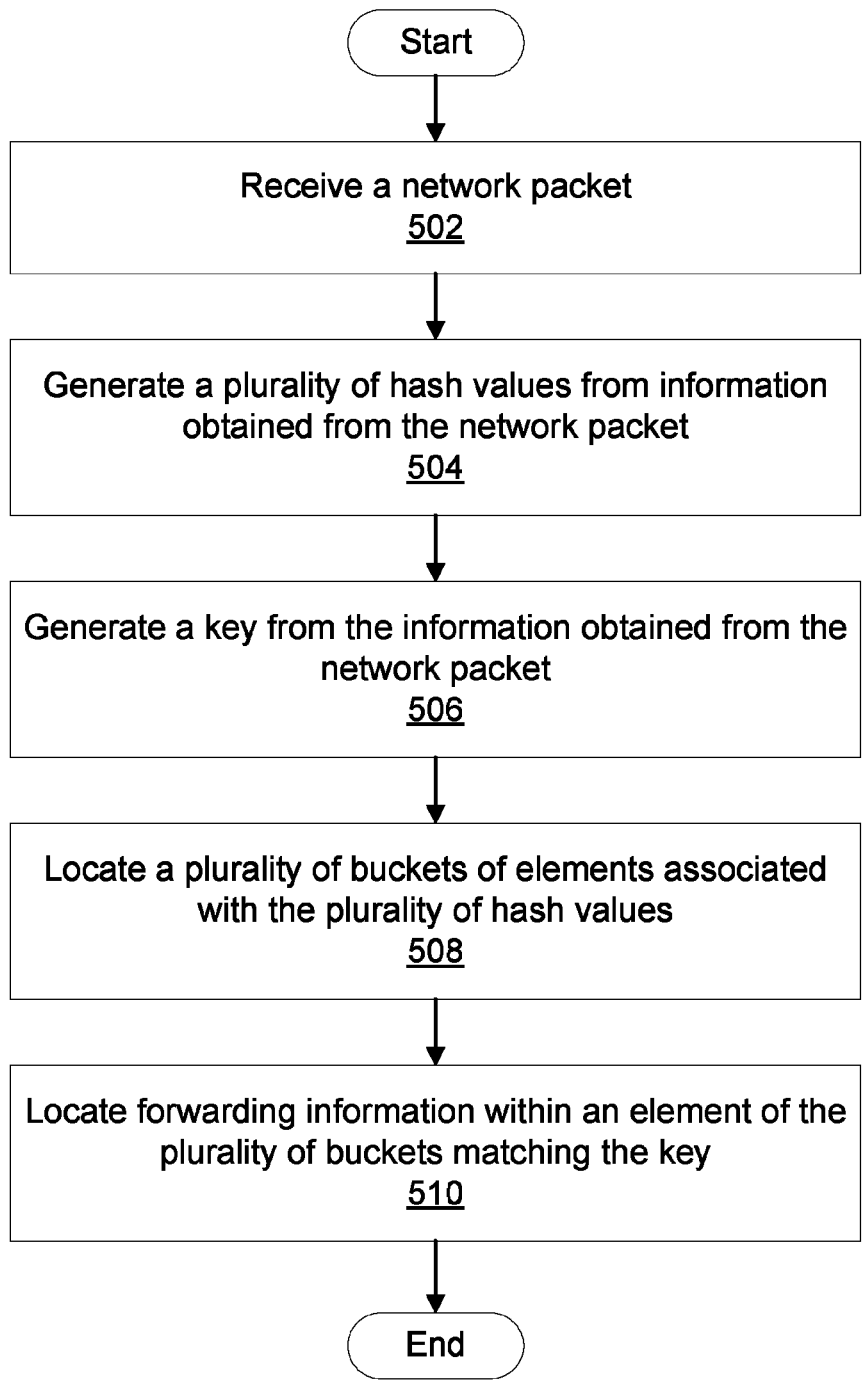
FIG. 5 illustrates a flowchart for implementation of several techniques according to certain embodiments for locating forwarding information.

FIG. 5 illustrates a flowchart 500 for accessing a forwarding table without the use of an indirection table. The forwarding table referenced by FIG. 5, may be populated with forwarding information such as network addresses, MAC addresses, or other. Forwarding table can be configured upon power up of a network device and can be periodically updated via a control plane of a network infrastructure. Forwarding table of FIG. 5 is therefore referred to as a static forwarding table. At 502 of flowchart 500, the network packet is received by a network device. The network device can be network device 100 or 200, for example. At 504, a plurality of hash values from information obtained from the network packet can be generated. This information can be parsed from a header of a network packet, for example. Specific rules can be used to generate these hash values. These rules can be selected to account for various different operational profiles of a network device depending on the traffic that the network device may receive, the size of a network, an expected position of the network device within a network, or other. When implementing hashing techniques, these variables may need to be taken into account for various permutations of device location and/or expected data set processing. Attempting to cover all of these permutations with hashing techniques may result in less than optimal distribution of information across hash buckets, resulting in unused space in forwarding or data tables across devices.

At 506, a key can be generated from the information obtained from the network packet. The key can be a unique value to locate a unique forwarding element table element or forwarding of the network packet. The hash values and the key can be used in conjunction to locate a unique forwarding table element. At 508, a plurality of buckets of elements associated with the plurality of hash values can be located. The elements may be located concurrently to expedite forwarding of the network packet. At 510, specific forwarding information can be located within a singular element of the plurality of buckets. The key generated in 506 can be matched or otherwise compared to information stored within each element of each bucket in order to locate the singular element containing the desired forwarding information (such as the longest prefix match).

In certain embodiments, Longest Prefix Match (LPM) techniques are used for generation of hash values from a network packet and locating corresponding forwarding information within a forwarding table. For example, a single network device can include several forwarding tables (8, for example). A plurality of hash values can be generated corresponding to differing lengths of a destination IP address parsed from a network packet. A longer length can indicate more specificity than a shorter length. For example, an IPv4 address (being 32-bits long) can be used to generate 8 different lengths, each varying by 4 bits. Each of these lengths of the same destination IP address can then be used to generate a corresponding hash value and/or table index.

Figure 6:
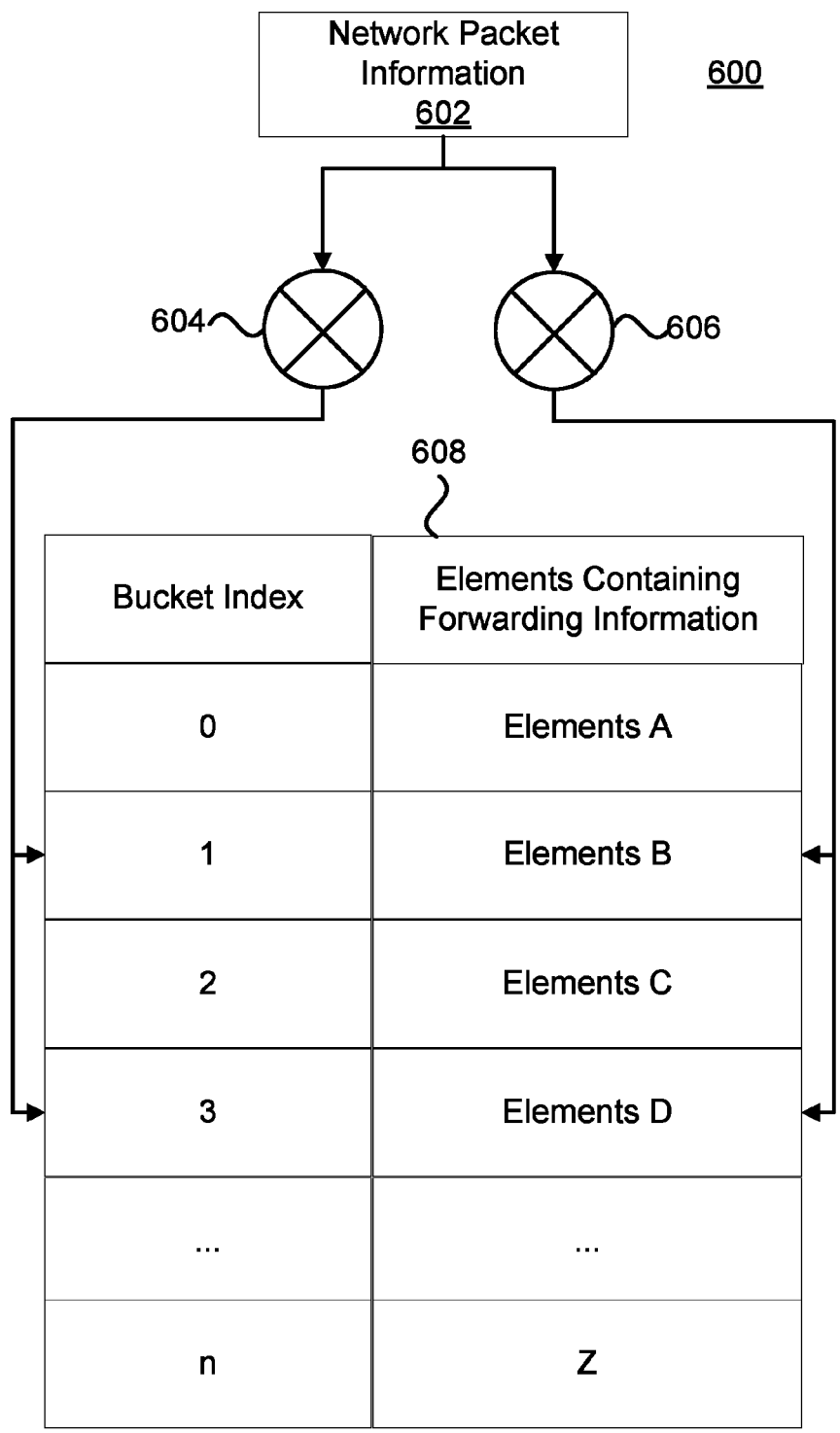
FIG. 6 illustrates an example diagram of a system for performing the techniques of FIG. 5.

FIG. 6 illustrates a logical diagram 600 of a forwarding table 608 and associated hashing/key generation techniques 604 and 606 according to the method represented by flowchart 500. Diagram 600 begins with network packet information 602. This network packet information can be received by parsing a network packet to obtain header or other information from the packet. The information can then processed via the first hashing technique 604 and second hashing technique 606. Hashing technique 604 can be used to generate a plurality of hash values such as via 504 of flow chart 500. Hashing technique 606 can generate a key such as via 506 of flowchart 500. The hash values can be used as indexes to buckets stored within forwarding table 608. The buckets can be contained within a segment or can be distributed across several different segments, as illustrated in FIG. 3. Diagram 600 illustrates that hash values generated by hashing technique 604 indicate bucket index 1 and bucket index 3. Each of buckets 0 through n each comprise a plurality of elements labeled A through Z. In forwarding table 608, bucket index 1 is associated with elements B and bucket index 3 is associated with elements D. Using the key generated by hashing technique 606, a specific element of elements B and elements D can be located, the specific element containing forwarding information for the network packet information 602.

Although the contents of elements A through Z are not illustrated, some of the elements may be empty or otherwise not contain forwarding information due to imperfect hashing techniques, for example. Because of this, memory allocated to forwarding table 608 may not be optimally used. Furthermore, memory allocated to forwarding table 608 may be dedicated memory for the use of the forwarding table. The dedicated memory can be relatively high speed/low latency memory to expedite searching of forwarding information. Therefore, if elements A are not populated with forwarding information, a network device implementing a system of diagram 600 may contain empty memory locations. The empty memory locations may lead to unnecessary power usage, device cost, and/or heat generation.

Hashing technique 604 can use a hashing space that is larger than the number of bucket indexes (0-n). For example, a modulus operation can be used to generate a hash value of 0-1023. A forwarding table, such as forwarding table 608, may not include 1024 buckets. Therefore, each bucket may be associated with a range of hash reference values, such as 0-99, 100-199, etc. Multiple hash values can therefore be associated with a range of hash reference values that are associated with a bucket. This can lead to further uneven distribution of values across buckets as hash values may be truncated together.

Figure 7A:
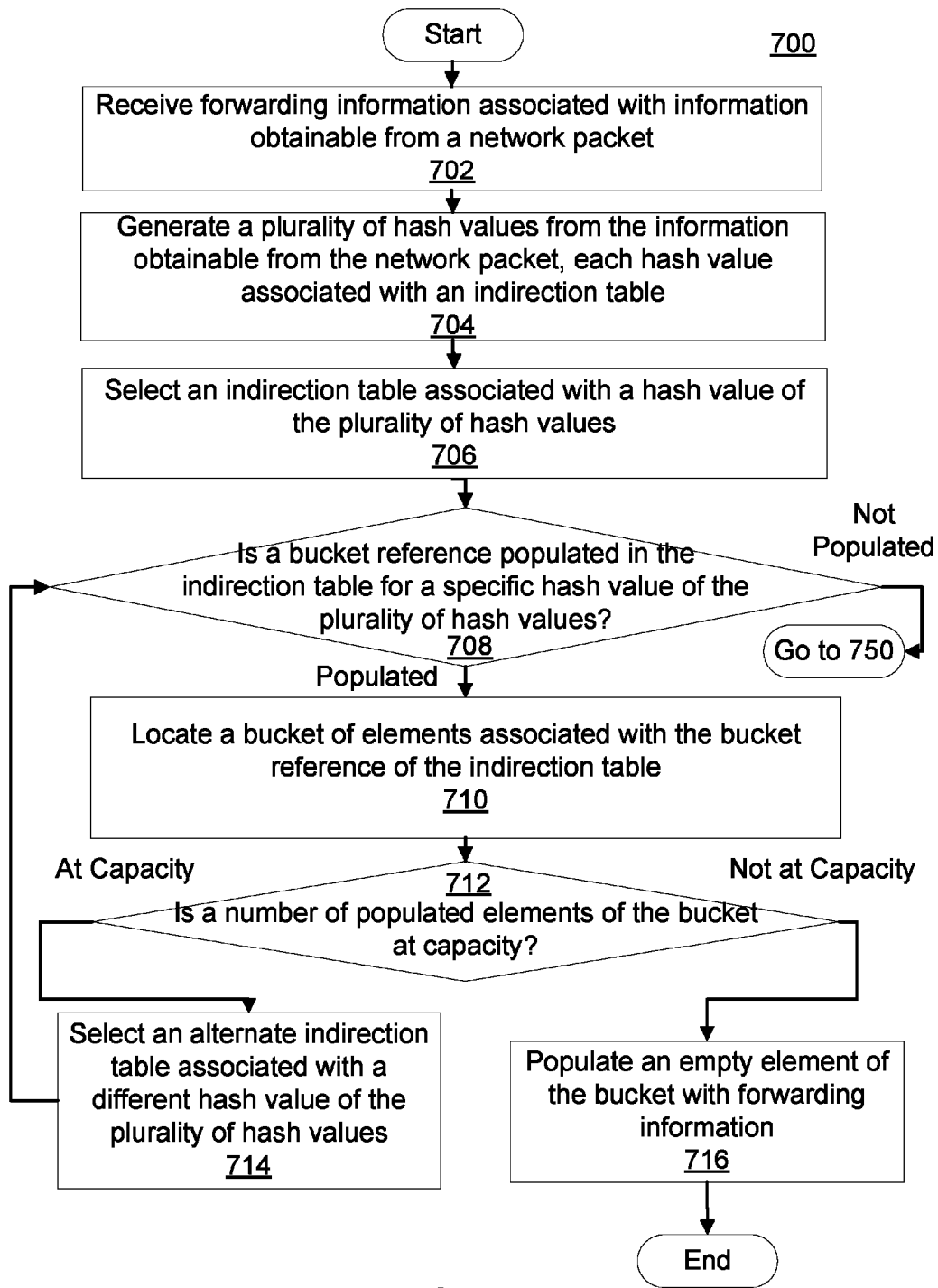
FIGS. 7A and 7B illustrate a flowchart for implementation of several techniques according to certain embodiments for storing forwarding information.
Figure 7B:
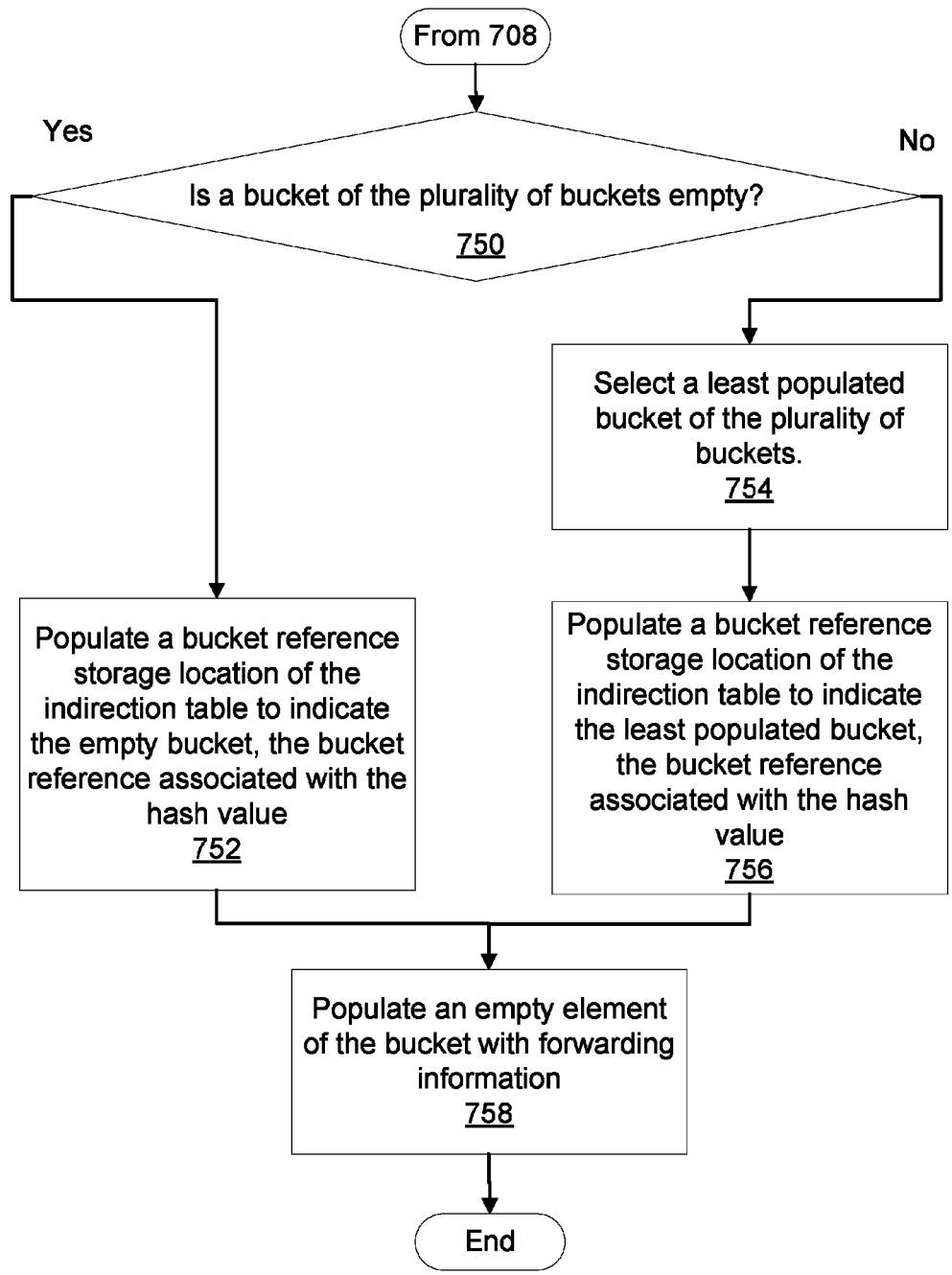

FIGS. 7A and 7B illustrates a flowchart 700 for populating a forwarding table according to certain embodiments. At 702, forwarding information associated with a network packet can be received. The forwarding information can be obtained by parsing a network packet, for example, and associating the parsed information with received forwarding information. Otherwise, the forwarding information can be obtained directly from the network packet. At 704, hashing techniques can be used to generate a plurality of hash values using the information received at 702. As one example, a plurality of quotients and/or remainders can be generated from the forwarding information for a data packet. Forwarding information can be parsed from a data packet, for example. As one example, a plurality of prefixes of differing values can be appended, added to, or otherwise used to modify the forwarding information. A plurality of quotient/remainder pairs can be generated for each of the set of modified forwarding information. In this manner, a plurality of hash values can be generated from one received data value. The quotients can correspond to a hash value, as used herein. The remainder can correspond to a key, as used herein. Additionally, the quotients and/or remainders can be arranged or used to generate hash values or key values, as used herein. As another example, a modulo operation can be performed on any of the quotient, remainder, hash value, or key values to generate new remainder value(s) having a different range. The modulo operation is an example technique that can be used to generate values for selection of indirection table hash references, bucket indexes, or the like, especially when each of the references and/or indexes have different ranges.

At 706, an indirection table can be selected corresponding to a specific hash value generated at 704. The indirection table can be one of a plurality of indirection tables. Each indirection table, as disclosed herein, can comprise a plurality of hash references and bucket reference storage locations. The hash references can be indexed by a hash value. A specific indirection table can be selected by techniques associated with the forwarding information. For example, certain bits can be selected, such as a certain number of most significant bits. Alternatively, a number of least significant bits can be selected, a modulo operation can be performed on the forwarding information, or other. Each indirection table can be associated with one or more forwarding tables that can be organized according to FIGS. 3 and 4. For example, a bucket reference storage location can contain an bucket index that can be used to select a corresponding bucket of a forwarding table. The techniques shown in FIGS. 7A and 7B can enable sequential selection of forwarding tables to select an appropriate element of a forwarding table for population. The populated element can later be retrieved by searching the forwarding tables sequentially.

At 708, a determination can be made as to if an indirection table bucket reference storage location is populated for a specific hash value of the plurality of hash values. For example, a hash value can be generated for a specific forwarding information that indexes a hash reference of a selected indirection table. An indirection table bucket reference associated with the hash reference can be searched to determine if it is already populated with a bucket reference. If the bucket reference is already populated (described in further detail below, with reference to 710), it can indicate that information for storing a network packet associated with a same hash value has already been stored. If the bucket reference is not populated (described in further detail in FIG. 7B, at 750), then, through use of the indirection table, a new bucket can be selected to be referenced and associated with the hash value. It should be understood that the without the use of the indirection table, as described in reference to FIG. 5 and FIG. 6, the hash value is used to directly reference a bucket of a forwarding table. The indirection table can thus be used to "redirect" the hash value to a different bucket.

If it is determined that the indirection table bucket reference storage location is populated with a bucket reference, the technique can proceed to 710 where a bucket of elements associated with the bucket reference can be located. For example, the bucket reference can be an index indicating the bucket, a pointer indicating the bucket, or other. At 712, a determination can be made as to if a number of elements of the bucket are at a capacity. For example, the elements may be full and incapable of storing addition forwarding information. Otherwise, the elements of the bucket may be half full, three quarters full, or other. If it is determined that the bucket is not at capacity, then, at 716, an empty element of the bucket can be populated with forwarding information. Alternatively, if it is determined that the bucket is at capacity, then the technique can attempt to migrate the forwarding information.

Migration of forwarding information can include, at 714, selecting an alternate indirection table and/or forwarding table associated with a different hash value of the plurality of hash values. For example, a new table index can be generated and a new indirection table selected and/or searched according to techniques illustrated by flowchart 700. For example, a network device can comprise a plurality of forwarding tables, each forwarding table associated with a corresponding indirection table. Migration can be used to sequentially select an indirection table/forwarding table pair for determination of an appropriate location to store forwarding information. It should be understood that, in certain embodiments, only one hash reference of each indirection table can be associated with a single hash value. This is because the hash value can be used as an index into the indirection table(s). For example, when searching the index tables, each one can be searched concurrently. As such, when populating the indirection tables, only one hash reference may be used in association with a given hash value.

FIG. 7B illustrates methods for more evenly distributing forwarding information into forwarding table(s) of a network device, for example. By ensuring better distribution, speed benefits can be obtained when searching the forwarding tables to locate a specific forwarding information value. Additionally, memory usage for storing the forwarding tables can be more evenly distributed, which can aid in power gating functionality to reduce power consumption. If it is determined, via 708, that a bucket reference is not populated, then at 750 a determination can be made if a bucket of the plurality of buckets of a forwarding table is empty. If an empty bucket is located, then, at 752, a bucket reference storage location associated with the hash reference can be populated with bucket reference to point to the empty bucket. Examples of bucket references are indexes and pointers. At 758, an empty element of the bucket can be populated with the forwarding information.

If it is determined that a bucket of the plurality of buckets of the forwarding table is not empty, then, at 754, a least populated bucket of the plurality of buckets can be selected. By selecting a least populated bucket, the populated elements of buckets within a forwarding table can be more evenly distributed. Various techniques can be used to determine least populated or empty buckets. Furthermore, various techniques can be used to select a bucket in case several buckets are evenly populated (or unpopulated). For example, a randomization technique can be used. At 756, a bucket reference storage location associated with the hash reference can be populated with bucket reference to the least populated bucket. At 758, an element of the bucket having least populated buckets can be populated with the forwarding information.

In certain embodiments, LPM techniques are used for insertion of forwarding route information into a forwarding table. LMP techniques can include rounding a route to be inserted down to a nearest predetermined prefix length (for example, rounded down to a multiple of 4 bits). A single hash value can be generated from this rounded value along with a table index. A forwarding table can then be located using the table index and a bucket of the forwarding table located using the hash value (at 710, for example). If the bucket is at capacity (e.g., full), then, another hash value can be generated by rounding the forwarding information to a next nearest predetermined prefix length. Furthermore, a next table index can be generated using the next nearest predetermined prefix length. Using the next table index and hash value, a new table and bucket, respectively, can be located for population with the forwarding information (at 714, for example). A determination can again be made if the new bucket is at a capacity. In certain embodiments, each forwarding table is associated with a different table index and each hash value can be used to reference a bucket of any of the forwarding tables. The table index can thus be used to associate a specific hash value with a specific forwarding table. The techniques disclosed can continue iteratively until a bucket of a forwarding table is located that is not at a capacity (and thus eligible to be populated with the forwarding information) or it is determined that all eligible buckets of all forwarding tables are at capacity. If all eligible buckets of all forwarding tables are at capacity, then the packet may be dropped and/or an error reported.

Figure 8:
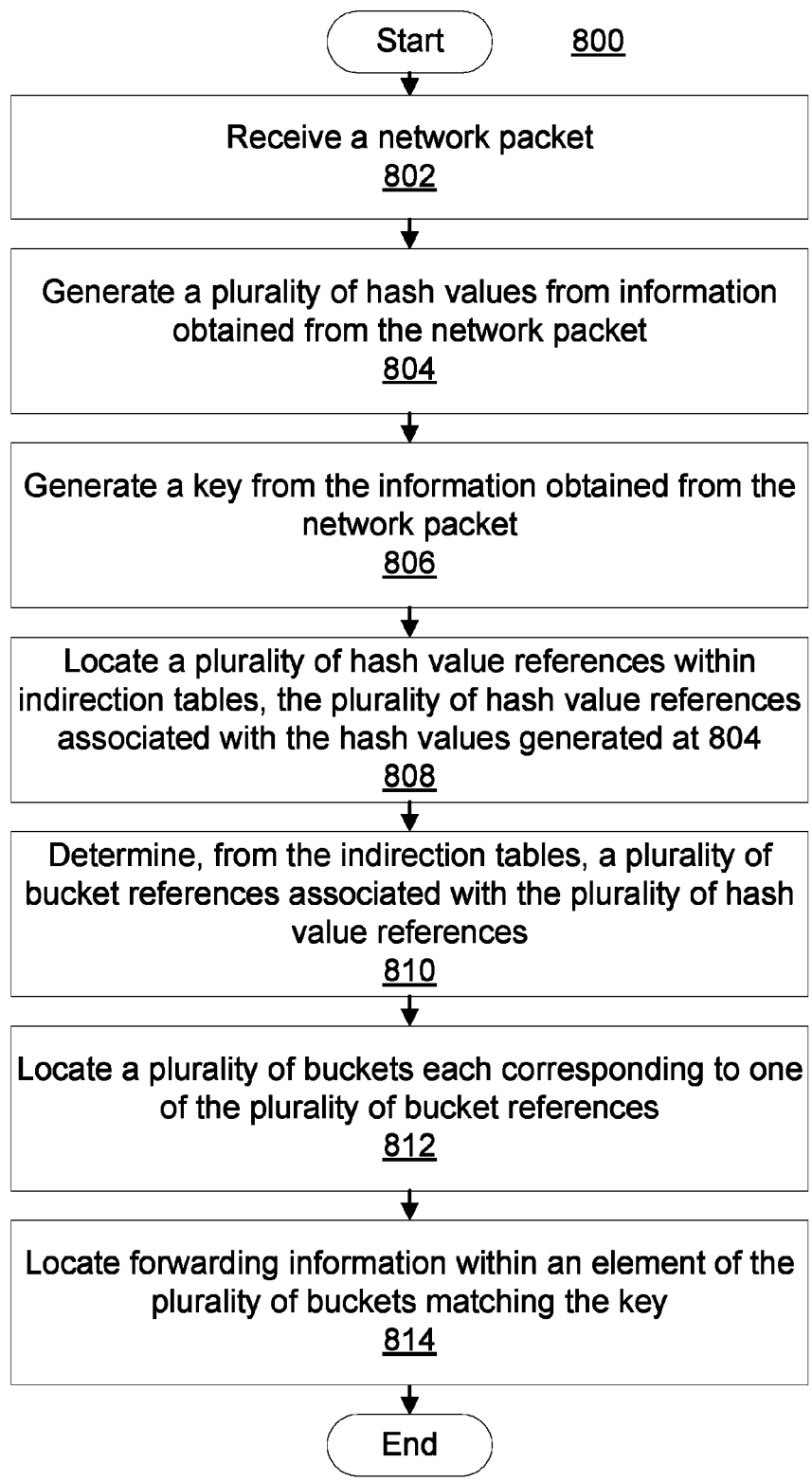
FIG. 8 illustrates a flowchart for implementation of several techniques according to certain embodiments for locating forwarding information.

FIG. 8 illustrates a flowchart 800 for locating forwarding information stored by flowchart 700, for example. At 802, a network packet can be received by a network device implementing a forwarding table and associated indirection table.

At 804, a plurality of hash values can be generated from information obtained through the use of a hashing technique. The hashing technique used in 804 can be similar to the hashing technique used in 504. At 806, a key can be generated using the hashing technique, or an additional hashing technique. Hashing technique(s) used in 806 can be similar to the hashing technique used in 506. At 808, a plurality of hash reference values within indirection tables can be located using the plurality of hash values generated in 804. The plurality of hash values can be used as indexes, pointers, or otherwise to locate associated hash reference values of the indirection tables. The indirection tables can be searched concurrently in order to expedite location and retrieval of specific forwarding information. In certain embodiments, a certain hash value of the plurality of hash values can be used to locate a hash reference of each indirection table.

At 810, a plurality of bucket references, each associated with a hash value of the plurality of hash reference values, can be determined from the indirection tables. The indirection tables can be organized such that each hash value reference is associated with a corresponding bucket reference. For example, a memory address of each indirection table can be reserved for a hash value reference and can be co-located with a memory address of a corresponding bucket reference. At 812, a plurality of buckets each corresponding to plurality bucket references can be located. The bucket references can be indexes, pointers, or other indicators used to reference corresponding buckets. At 814, forwarding information within an element of the plurality of buckets can be located through the use of the key generated in 806. The locating of the forwarding information of 814 can be similar to locating of forwarding information of 510.

In certain embodiments, LPM techniques are used for searching for forwarding route information from forwarding table(s). As disclosed herein, using LPM techniques can result in populating a bucket of a forwarding table with forwarding information of varying prefix length. Alternatively or additionally, forwarding information from multiple forwarding tables can be searched concurrently and a forwarding entry returned from each forwarding table. For example, the key can be used to located an entry in a bucket of each forwarding table of several forwarding tables. At 816, an optional step can be performed of locating a specific forwarding information value/destination address by determining a longest match. As disclosed herein, the longest match can indicate a destination address with greater specificity than a shorter match.

Figure 9:
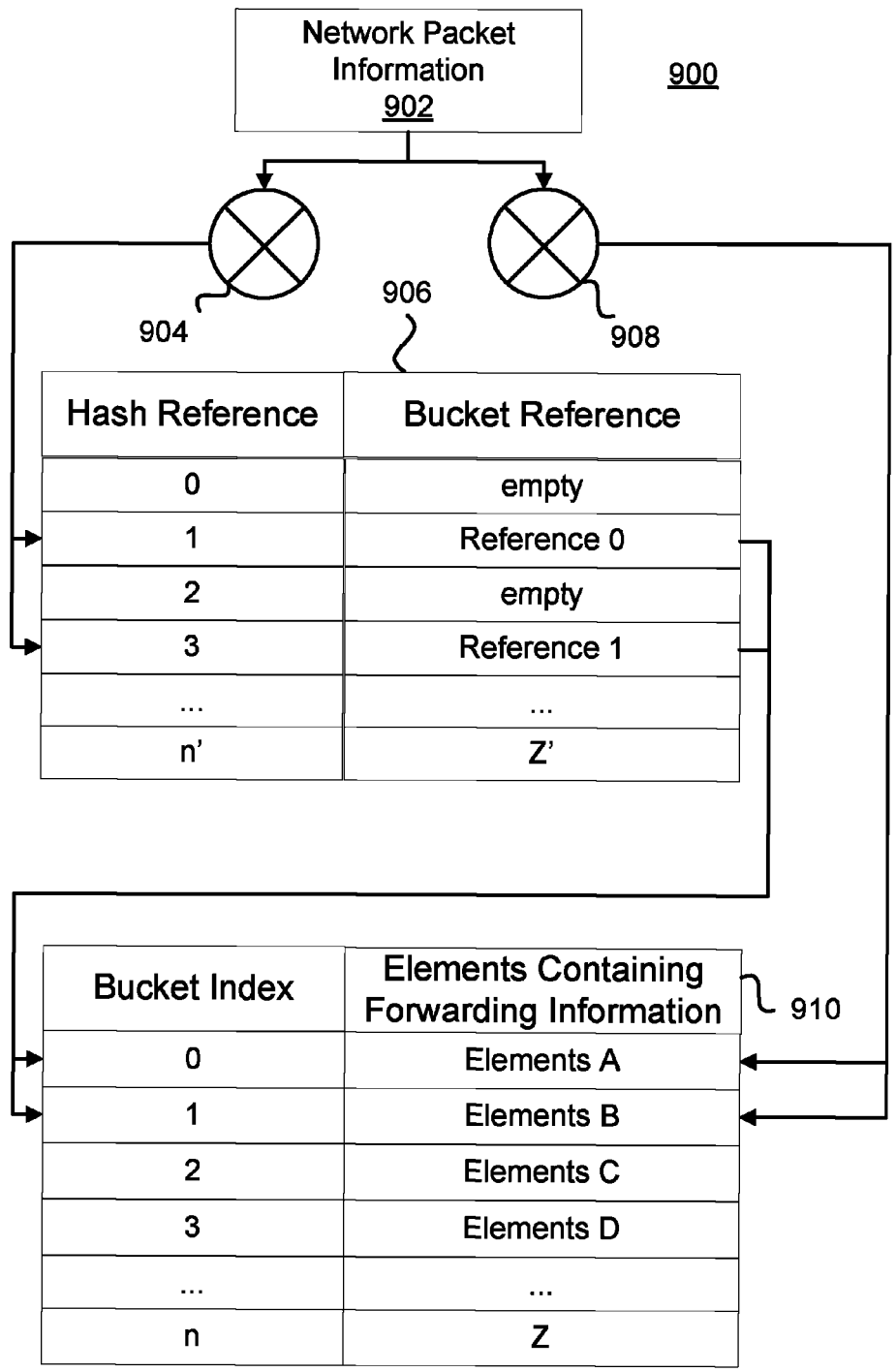
FIG. 9 illustrates an example diagram of a system for performing the techniques of FIG. 7 or 8.

FIG. 9 illustrates a logical diagram 900 of a forwarding table 910, indirection table 906, and associated hashing/key generation techniques 904 and 608 according to the methods represented by flowcharts 700 and 800. Hash generation techniques 904 and 908 can be similar to hashing techniques 604 and 606 can be used to generate a hash and key respectively. In the example diagram 900, hash generation function 904 has generated hashes corresponding to bucket indexes 1 and 3. However, unlike diagram 600, the hash values are used to locate hash references of indirection table 906 instead of forwarding table 910. Hash reference 1 is illustrated as being associated with Bucket reference 0 and Hash reference 3 is illustrated as being associated with Bucket reference 1. As disclosed, bucket references can be dynamically assigned to the indirection table to associate any hash reference with a corresponding bucket reference according to various rules. In this example, Bucket reference 0 is used as an index to Bucket Index 0 of forwarding table 910. Bucket Reference 1 is used as an index to Bucket Index 1 of forwarding table 910. A key generated by hashing technique 908 can then be used to locate specific forwarding information stored with an element of Elements A and Elements B of Forwarding table 910.

Features of the disclosure can be used to populate a forwarding table with forwarding information that would otherwise be dropped. For example, using a only a hashing technique that indexes directly into the forwarding tables, without the benefit of an indirection table, if a hash associated with a specific network packet to be forwarded is associated with bucket(s) lacking a free element and additional forwarding information is to be added to the table, the network packet may be dropped or require migration as no element in the forwarding table may be available to contain the network packet. Through use of an indirection table, another bucket can be selected to store the forwarding information. Furthermore, memory for a forwarding table can be more efficiently allocated. For example, an amount of fixed memory for implementation of a forwarding table can be reduced.

The number of elements for storage of hash references or bucket references within an indirection table does not have to equal a number of buckets in a forwarding table or a number of hash values able to be generated by a hash function. For example, the indirection table can store more elements than an associated forwarding table. Such a schema can aid in distribution of forwarding information. For example, if a forwarding table has less entries that available hash values that can be generated by a hashing technique, then hash values generating by the hashing technique may be rounded to locate an appropriate bucket. By using a larger indirection table, the amount of rounding may be minimized.

As one example, a hashing technique can utilize a range of 100 k (e.g., the hashing technique may generate one of 100 k values). A table, such as a forwarding table or an indirection table may include only 10 k entries as each entry may require memory space. If so, each entry of a table may be associated with 10 hash values (e.g., each entry include a range of values in which a hash value may fall within). Utilizing indirection tables can provide more flexibility in deciding range values for modulus operations. For example, referencing FIG. 12, indirection table 1202 is illustrated as including 10 k entries whereas forwarding table 1204 is illustrated as including 1 k references. Forwarding table 1208 (not utilizing an indirection table) includes 10 k entries. Given the previous example of a hashing technique having a range of 100 k, each entry of forwarding table 1208 could be correlated with 10 hash values. Each entry of forwarding table 1204 could be correlated with 100 hash values, reducing accuracy when storing or retrieving forwarding information from elements of forwarding table 1204. Use of indirection table 1202 can relieve the reduced accuracy by providing 10 k of entries which can be accessed by the 100 k range of the hash values. As disclosed herein, bucket references of indirection table 1202 can then correspond to any bucket index of forwarding table 1204, regardless of a generated hash value. Furthermore, indirection table 1202 may include 100 k or other ranges of values to further reduce collisions between hash values and buckets.

Any number of indirection tables can be associated with any number of forwarding tables. A one-to-one relation is not necessary. An indirection table can be associated with a plurality of forwarding tables or vice versa. The indirection table(s) and forwarding table(s) can be located on any number of physical memory integrated circuit dies. In certain embodiments, a modulo operation can be used at 904 for generation of a certain number of hash values to locate a corresponding hash reference (0-n'). This modulo operation can be different from a modulo operation used at 604 of FIG. 6 (having a range of 0-n). In certain embodiments, range 0-n' can be greater than range 0-n, resulting in an indirection table that may have more hash references than bucket indexes 0-n (such as for forwarding table 910). The increased range of values can be used to better distribute forwarding information when populating forwarding table 910, for example, by enabling more fine-grained increments of indexes.

Certain embodiments can be used for verification, validation, and testing of network devices. A network device using hashing techniques to directly index a forwarding table, such as those illustrated in FIGS. 5 and 6, may require a relatively large data set and a relatively large amount of memory dedicated to forwarding table(s). This is because the network device may be designed to operate in a wide variety of network conditions in different positions in a networking infrastructure. Therefore, the network device may need to be verified and validated with many representative use cases, some of which may require relatively large forwarding table(s). Using features of certain embodiments, verification and validation can be accomplished using less memory dedicated for storing forwarding table(s). This is because forwarding information can be consolidated through use of the indirection table to populate buckets for storage of forwarding information. The buckets that are populated can be dissociated from values generated via hash techniques.

In certain embodiments, indirection tables can be used to reduce system requirements for verification of a network device wherein the network device or components of the network device are modeled using a simulation model in software. Simulating one or more hardware components of a network device (or other hardware device) can be relatively costly and time intensive. For example, forwarding tables, as used herein, can be simulated using software constructs. Verifying the network device using simulation models may allow for performing preliminary tests in a pre-silicon environment before the device is physically manufactured. Once the device if manufactured, fixing problems in the design is both costly and time consuming.

Through the use of indirection tables, a network device, for example, can be simulated with relatively fewer resources traditionally required for simulation. The indirection table can be used to dissociate the forwarding table functionality from hashing functionality, for example. A network device using hashing techniques for direct indexing of the forwarding tables, such as those illustrated in FIGS. 5 and 6, may require a relatively large forwarding table in order to model the same architectural view of the network device in the simulation model as the physical network device. Through the use of indirection table(s), use of significantly smaller forwarding table(s) may be realized. The simulation model can use the indirection table to provide the same architectural view of the network device, while concealing differences in the micro-architectural details in the simulation model. For example, the simulation model can expose the same number of hash indexes (i.e., hash references) supported by the table (i.e., indirection table), while concealing micro-architectural details, such as the size of the forwarding table concealed behind the indirection table. This separation can enable forwarding table simulation resources to be minimized for validation of new network device designs and/or improvements.

Figure 12:
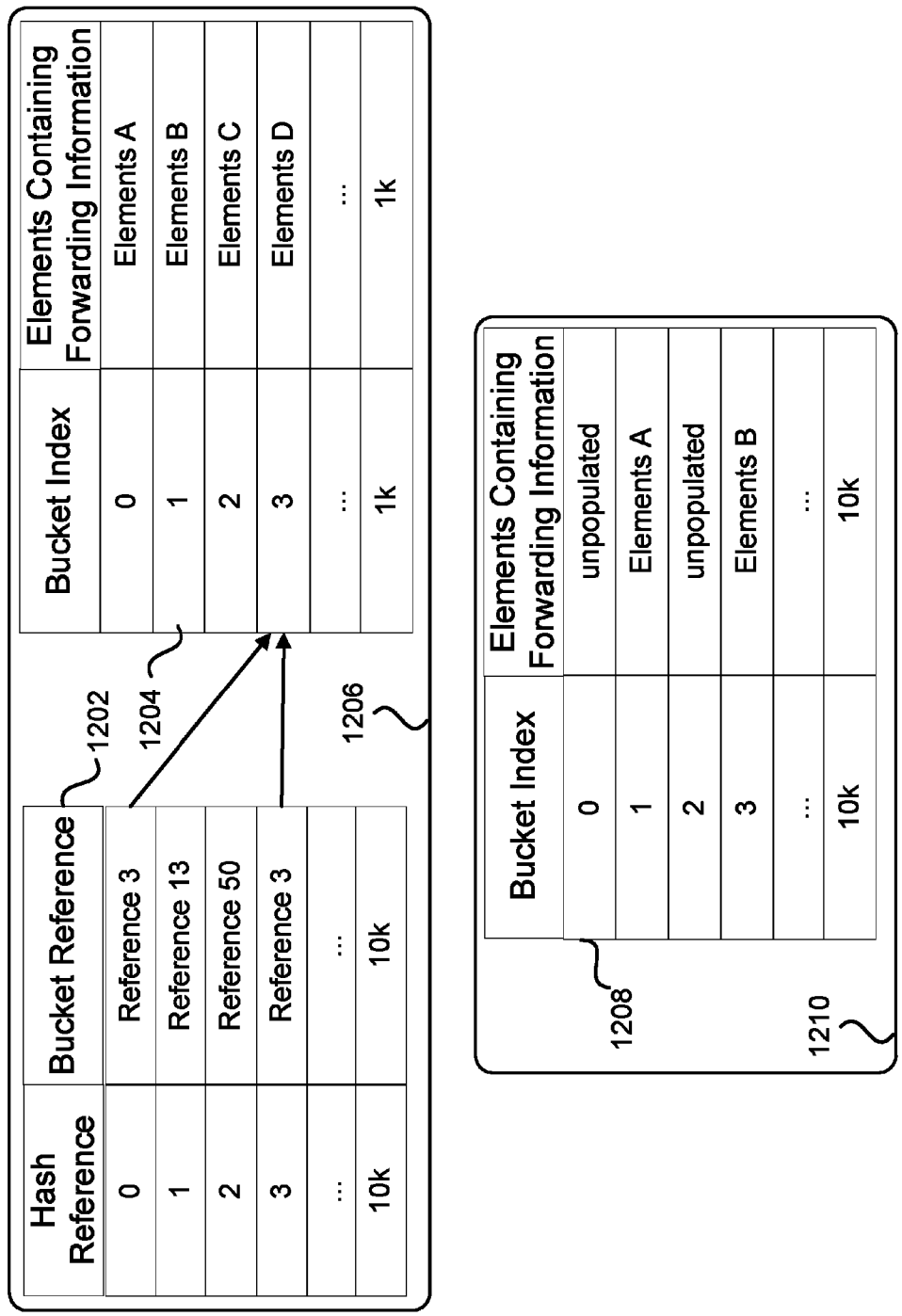
FIG. 12 illustrates forwarding table arrangements according to certain embodiments.

FIG. 12 illustrates example forwarding table configurations according to certain embodiments. FIG. 12 illustrates a network device simulation 1206 utilizing indirection tables according to certain embodiments. Network device simulation 1210 does not includes an indirection tables. As disclosed herein, indirection tables can be used to minimize forwarding tables size requirements to simulate a network device. For example, forwarding table 1208 of network device simulation 1210 is illustrated as including 10 k bucket index entries (and corresponding elements containing forwarding information). Note that some of the elements corresponding to a bucket index are unpopulated (such as for bucket indexes 0 and 2). As disclosed herein, if a hashing technique is not perfect, several elements can be unpopulated for a given input data set. When simulating a network device, multiple different configurations of input data sets can be utilized to validate a network device design. Each input data set may only utilize a portion of elements of a forwarding table, but the simulation may include enough elements and enough indexes to simulate all input data sets.

Network device simulation 1206, includes indirection table 1202 and forwarding table 1204. Indirection table 1202 can serve to dissociate forwarding table from hashing techniques. For example, a hash value of 11 may be generated for a given input data set. The hash value of 11 may point to a Bucket index of 1 in network device simulation 1206, but may only point to bucket index 11 in network device simulation 1210. By dissociating the forwarding table bucket indexes from the hash value generation, a smaller forwarding table can be used. For example, forwarding table 1204 includes 1 k entries. Furthermore, forwarding table 1204 is illustrated as only including populated elements (condensing the usage of elements of forwarding table 1204 as compared to forwarding table 1208).

Figure 10:
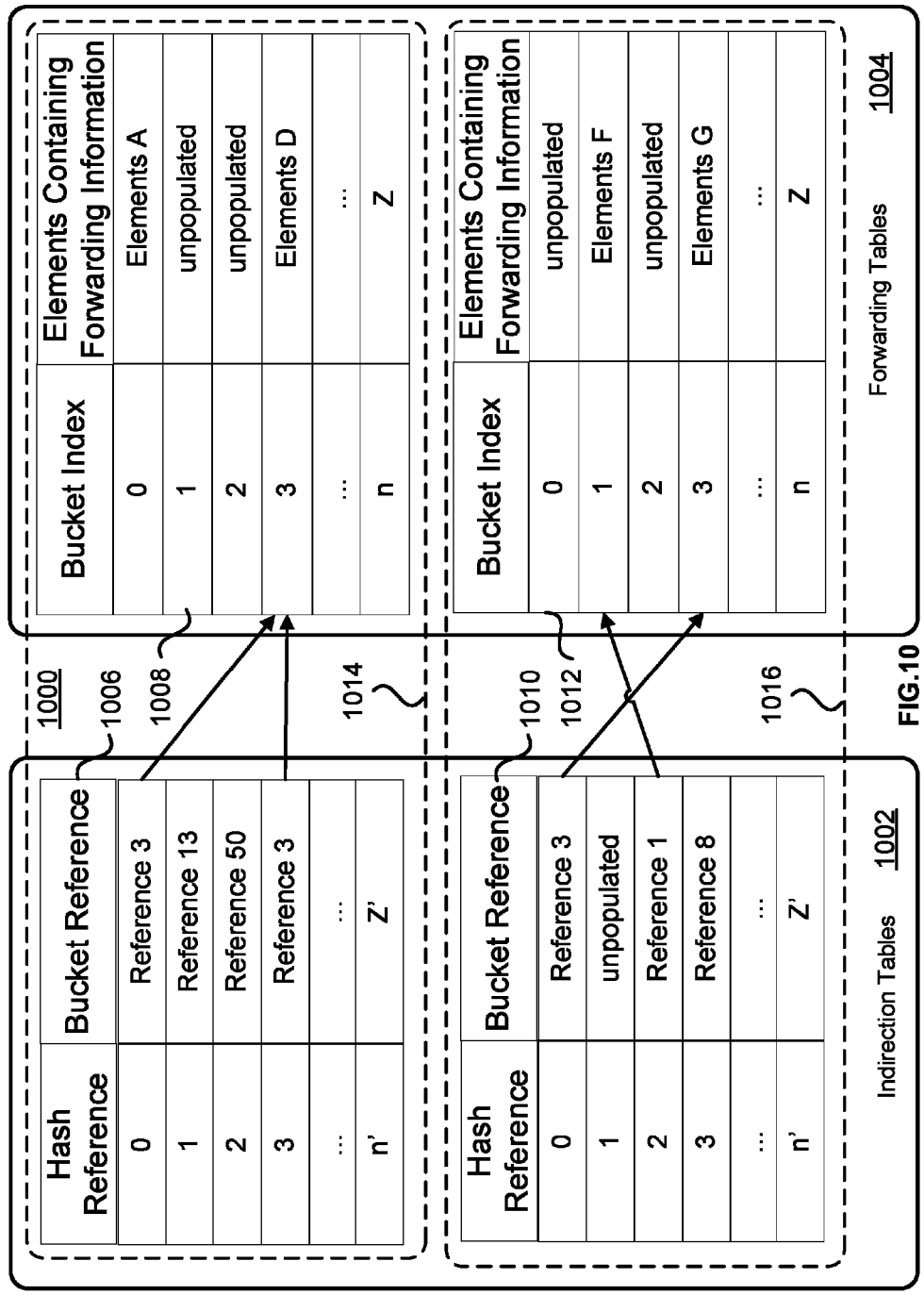
FIG. 10 illustrates an example logical diagram of a plurality of indirection tables and a plurality of hash bucket tables according to certain embodiments.

FIG. 10 illustrates an example logical diagram of a plurality of indirection tables and a plurality of hash bucket tables according to certain embodiments. FIG. 10 illustrates several indirection tables 1002, that can each be similar to indirection table 906, for example. Also illustrated are several hash bucket tables 1004 that can each be similar to forwarding table 910, for example. Each of indirection tables 1002 can, in certain embodiments, be associated with a corresponding forwarding table of forwarding tables 1004. For example, indirection table 1006 can be associated 1014 with forwarding table 1008 and indirection table 1010 can be associated 1016 with forwarding table 1004. This association can be logical and/or physical. The association 1014 can prevent indirection table 1006 from referencing forwarding tables 1004 other than forwarding table 1008, for example.

Indirection table 1006, as an example, includes several bucket reference storage locations containing a bucket reference of "Reference 3." In this example, "Reference 3" is associated with Hash References 0 and 3. By following the "Reference 3" bucket reference, elements D can be located specific to search for or populate certain forwarding information. Similarly, indirection table 1010 includes a "Reference 3" bucket reference. Reference 3 of indirection table 1010 is illustrated as correlating to bucket index "3" of forwarding table 1012 (and not bucket index "3" of forwarding table 1008).

The bucket references and hash references can be organized in many different manners. For example, as illustrated, a one-to-one correlation need not exist between each bucket reference and each hash reference. The bucket references or the hash references can be organized in many different manners. For example, references can be organized sequentially or out of order. In certain embodiments, the hash references can be sequential whereas the bucket references are not. A bucket reference can be an index or a pointer to various numbers of forwarding tables that can be arranged in many different ways. For example, the forwarding tables can each be physically disposed on a separate integrated circuit die. They can be organized into segments in different manners.

The ranges of the number of hash references for each indirection table can be dissimilar. This is to say, each indirection table 1002 can have a different range of hash references. Each forwarding table 1004 can also have a dissimilar range of bucket indexes. The range of indexes of forwarding tables 1004 can be different from ranges of hash references for indirection tables 1002. Furthermore, additional tables can be associated with the illustrated indirection tables 1002 and forwarding tables 1004. For example, elements containing forwarding information can point to additional element(s) of table(s).

Figure 13:
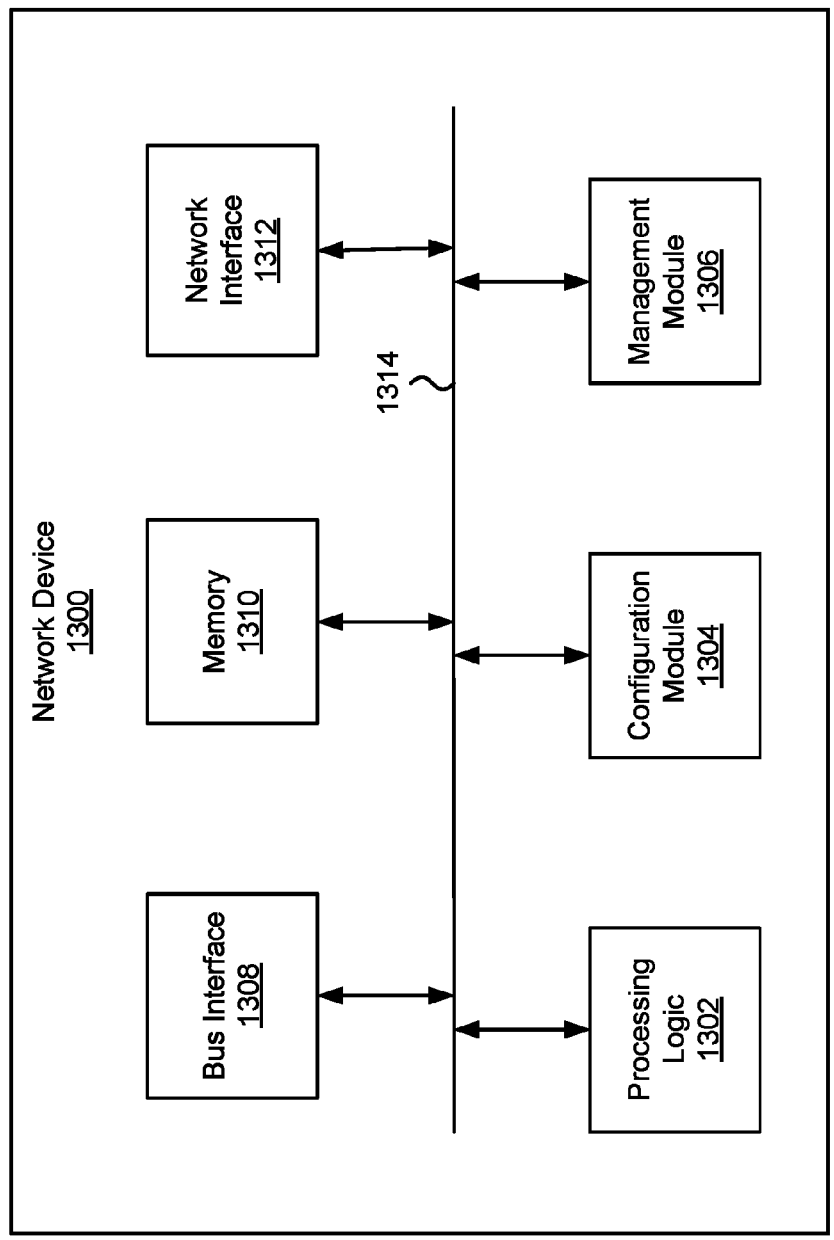
FIG. 13 illustrates an example environment of a network device for implementing aspects in accordance with some embodiments.

FIG. 13 illustrates an example of a network device 1300. Functionality and/or several components of the network device 1300 may be used without limitation with other features disclosed elsewhere in this disclosure, without limitations. For example, features of network device 100, the method of operation of a packet processor illustrated by flowchart 200, and/or the forwarding table/power domain features of FIGS. 3-9 can be implemented by network device 1300. A network device 1300 may facilitate processing of packets and/or forwarding of packets from the network device 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1300 may be the recipient and/or generator of packets. In some implementations, the network device 1300 may modify the contents of the packet before forwarding the packet to another device. The network device 1300 may be a peripheral device coupled to another computer device, a switch, a router or any other suitable device enabled for receiving and forwarding packets.

In one example, the network device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The network device 1300 may include additional modules, not illustrated here, such as components discussed with respect to the nodes disclosed in FIG. 13. In some implementations, the network device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network device 1300, while in other cases some or all of the memory may be external to the network device 1300. The memory 1310 may store an operating system comprising executable instructions that, when executed by the processing logic 1302, provides the execution environment for executing instructions providing networking functionality for the network device 1300. The memory may also store and maintain several data structures and routing tables for facilitating the functionality of the network device 1300.

In some implementations, the configuration module 1304 may include one or more configuration registers. Configuration registers may control the operations of the network device 1300. In some implementations, one or more bits in the configuration register can represent certain capabilities of the network device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the network device 1300.

In some implementations, the management module 1306 may be configured to manage different components of the network device 1300. In some cases, the management module 1306 may configure one or more bits in one or more configuration registers at power up, to enable or disable certain capabilities of the network device 1300. In certain implementations, the management module 1304 may use processing resources from the processing logic 1302. In other implementations, the management module 1306 may have processing logic similar to the processing logic 1302, but segmented away or implemented on a different power domain than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the network device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.13 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1300 may include multiple network interface modules, each configured to communicate with a different network. For example, in these implementations, the network device 1300 may include a network interface module for communicating with a wired Ethernet network, a wireless 802.13 network, a cellular network, an Infiniband network, etc.

The various components and modules of the network device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 13.

Figure 14:
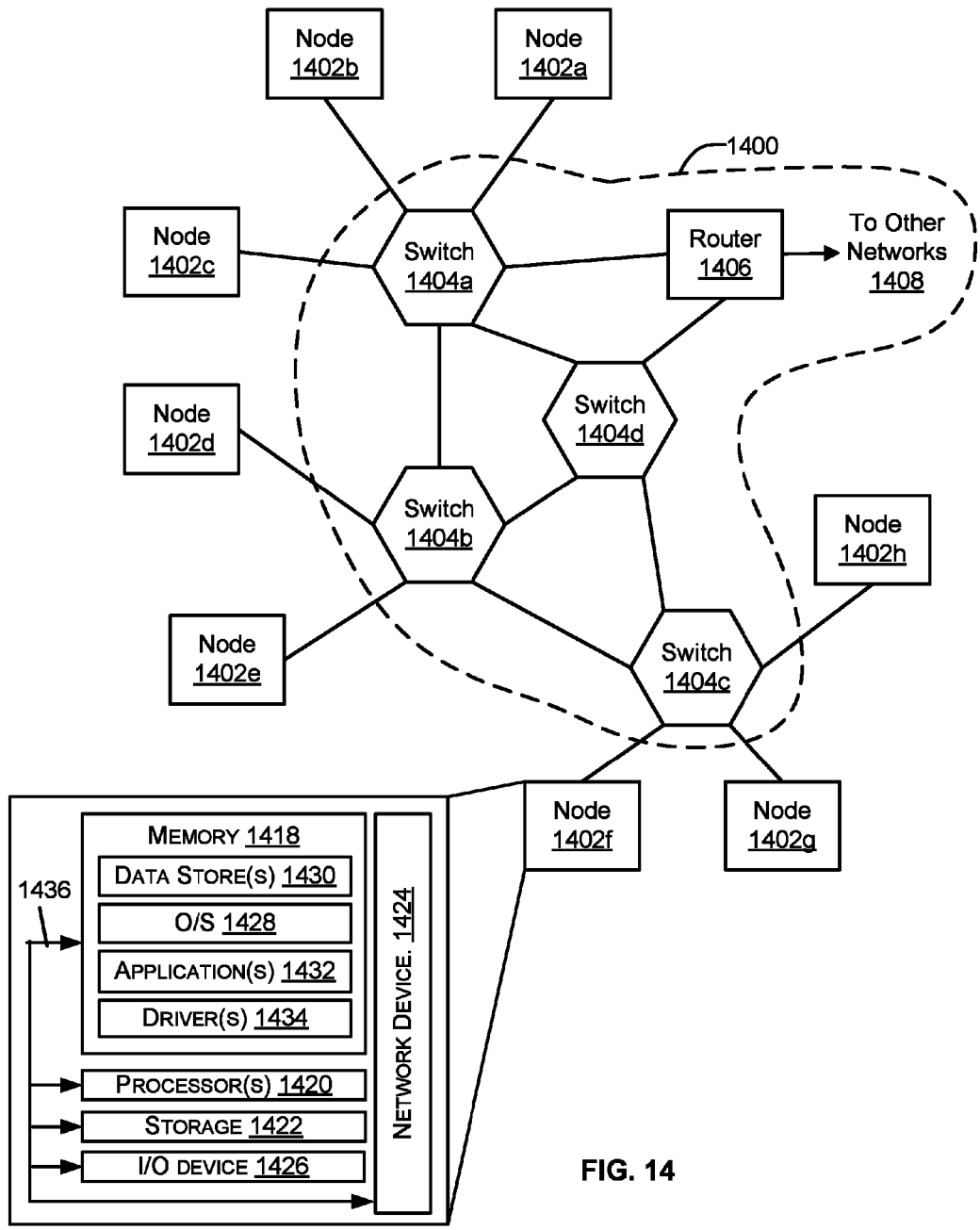
FIG. 14 illustrates an example architecture for features and systems described herein that includes one or more service provider computers and/or a user device connected via one or more networks, according to some embodiments.

FIG. 14 illustrates a network 1400, illustrating various different types of network devices 1300 of FIG. 13, such as nodes comprising the network device, switches and routers. In certain embodiments, the network 1400 may be based on a switched architecture with point-to-point links. As illustrated in FIG. 14, the network 1400 includes a plurality of switches 1404a-1404d, which may be arranged in a network. In some cases, the switches are arranged in a multi-layered network, such as a Clos network. A network device 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404a-1404d may be connected to a plurality of nodes 1402a-1402h and provide multiple paths between any two nodes.

The network 1400 may also include one or more network devices 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404a-1404d and router 1406, if present, may be referred to as a switch fabric, a fabric, a network fabric, or simply a network. In the context of a computer network, terms "fabric" and "network" may be used interchangeably herein.

Nodes 1402a-1402h may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1426 that allow the node(s) 1402a-1402h to communicate with a stored database, another computing device or server, user terminals and/or other devices on the network(s) 1400. The network device(s) 1424 of FIG. 14 may include similar components discussed with reference to the network device 1300 of FIG. 13.

In some implementations, the network device 1426 is a peripheral device, such as a PCI-based device. In these implementations, the network device 1426 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1426 may be connected to a computing system using a PCIe interface.

A PCI-based device may include one or more functions. A "function" describes operations that may be provided by the network device 1426. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1426 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
a first memory comprising a forwarding table configured to store, in a plurality of elements, forwarding information for forwarding of a network packet by the network device, wherein the plurality of elements are arranged into a plurality of buckets;
a second memory storing an indirection table comprising a plurality of hash references and a plurality of bucket references, wherein each hash reference from the plurality of hash references is associated with a bucket reference of the plurality of bucket references, and wherein each bucket reference of the plurality of bucket references indicates a bucket of the plurality of buckets;
processing logic configured to:
generate a plurality of hash values using information from a network packet received by the network device;
locate hash bucket references of the plurality of hash bucket references, each located hash bucket reference corresponding to a hash value of the plurality of hash values;
locate bucket references of the plurality of bucket references each corresponding to each of the plurality of hash references;
search for forwarding information stored in an element of the plurality of buckets indicated by the bucket references; and
forward the network packet based on the forwarding information.

2. The network device of claim 1, wherein the indirection table is one of a plurality of indirection tables, and the processing logic is further configured to:
locate indirection tables of the plurality of indirection tables, each indirection table associated with a hash value of the plurality of hash values, wherein the located bucket references are located from the indirection tables.

3. The network device of claim 1, wherein the plurality of hash values each reference a particular bucket of the plurality of buckets and the bucket references each reference different buckets of the plurality of buckets.

4. A system, comprising:
memory comprising,
a data table, the data table configured to store a plurality of buckets, wherein each of the plurality of buckets contains a plurality of elements, and
an indirection table, the indirection table comprising a plurality of hash references and a plurality of bucket references, wherein each hash reference from the plurality of hash references is associated with a bucket reference of the plurality of bucket references, and wherein each bucket reference of the plurality of bucket references indicates a bucket of the plurality of buckets; and
processing logic configured to:
generate a plurality of hash values using information from a network packet;
locate, in the indirection table, hash references of the plurality of hash references, each hash reference corresponding to each of the plurality of hash values;
locate bucket references of the plurality of bucket references corresponding to respective ones of the hash references; and
search for a value stored in an element of the plurality of buckets indicated by the bucket references.

5. The system of claim 4, wherein the memory comprises an additional indirection table associated with a corresponding data table;
wherein the additional indirection table comprises an additional plurality of hash references and an additional plurality of bucket references, wherein each of the additional plurality of bucket references indicates a bucket of additional plurality of buckets; and
wherein the processing logic is further configured to locate a hash reference in each of the indirection table and the additional indirection table, each hash reference corresponding to a hash values of the plurality of hash values.

6. The system of claim 4, wherein a total number of storage locations of the indirection table for storing the plurality of hash references is equal to a total number of storage locations of the indirection table for storing the plurality of bucket references.

7. The system of claim 6, wherein the generation of the plurality of hash values includes selecting the plurality of hash values from a set number of hash values; and
wherein the total number of storage locations of the indirection table for storing the plurality of hash references is less than the set number of hash values.

8. The system of claim 7, wherein a number of the plurality of buckets is less than a total number of storage locations of the indirection table for storing the plurality of bucket references.

9. The system of claim 4, wherein the system is a network device simulation system, wherein the data table is simulated in software using simulated memory.

10. The system of claim 4, wherein the processing logic is further configured to forward a network packet to a destination address based upon information associated with the value.

11. The system of claim 4, wherein two of the plurality of hash references are each associated with one of the plurality of bucket references.

12. The system of claim 4, wherein the processing logic further includes at least one of an Application Specific Integrated Circuit (ASIC), a processor, a microcontroller, a System on a Chip (SoC), a Field Programmable Gate Array (FPGA), or a Complex Programmable Logic Device (CPLD).

13. The system of claim 4, wherein the searching for a value stored in an element of the plurality of buckets comprises searching the plurality of buckets concurrently.

14. A system, comprising:
memory comprising,
a data table configured to store a plurality of elements in a plurality of buckets, and
an indirection table, the indirection table comprising a plurality of bucket reference storage locations and a plurality of hash references, each bucket reference storage location being associated with a corresponding hash of the plurality of hash references; and processing logic configured to:
generate a hash value using information associated with data to be stored in the data table;
locate, in the indirection table, one of the plurality of hash references corresponding to the hash value;
determine whether the bucket reference storage location associated with the one hash reference is populated;
upon determining that the bucket reference storage location associated with the hash reference is not populated:
locate, in the data table, one of the plurality of buckets that contains a least number of populated elements;
store the data in an element of the located bucket; and
populate the bucket reference storage location associated with the hash reference with a bucket reference corresponding to the bucket.

15. The system of claim 14, wherein locating the one of the plurality of buckets that contains a least number of populated elements includes:
determining whether a bucket of the plurality of buckets has no populated elements; and
upon determining that all buckets of the plurality of buckets have populated elements, locating the one of the plurality of buckets that contains the least number of populated elements.

16. The system of claim 14, wherein the memory further comprises an additional data table configured to store an additional plurality of elements in an additional plurality of buckets;
wherein the processing logic is further configured to:
locate the data table based on the hash value;
determine whether a number of populated elements of the data table is at a capacity; and
upon determining that the number of populated elements of the data table is at the capacity, locate the additional data table for storing the data.

17. The system of claim 16, wherein the processing logic is further configured to generate a plurality of table indexes, wherein the data table is located based on a first table index of the plurality of table indexes and the additional data table is located based on a second table index of the plurality of table indexes.

18. The system of claim 16, wherein each of the data table and the additional data table is associated with a single respective indirection table of the data table and the additional data table.

19. The system of claim 14, wherein the data is data associated with forwarding of a network packet within a network computer infrastructure.

20. The system of claim 14, wherein the system is a network device simulation system, wherein the data table is simulated in software using simulated memory.

* * * * *